United States Patent
Frank et al.

(10) Patent No.: US 10,250,306 B2
(45) Date of Patent: Apr. 2, 2019

(54) METHOD AND APPARATUS FOR DETERMINING PARAMETERS AND CONDITIONS FOR LINE OF SIGHT MIMO COMMUNICATION

(71) Applicant: Motorola Mobility LLC, Chicago, IL (US)

(72) Inventors: Colin Frank, Park Ridge, IL (US); Tyler A Brown, Lake Zurich, IL (US); Vijay Nangia, Algonquin, IL (US); Robert T Love, Barrington, IL (US); Udar Mittal, Rolling Meadows, IL (US)

(73) Assignee: Motorola Mobility LLC, Chicago, IL (US)

( * ) Notice: Subject to any disclaimer, the term of this patent is extended or adjusted under 35 U.S.C. 154(b) by 108 days.

(21) Appl. No.: 15/363,346

(22) Filed: Nov. 29, 2016

(65) Prior Publication Data
US 2018/0152228 A1    May 31, 2018

(51) Int. Cl.
*H04B 7/0456* (2017.01)

(52) U.S. Cl.
CPC .................... *H04B 7/0456* (2013.01)

(58) Field of Classification Search
CPC ... H04B 7/0456; H04B 7/0608; H04B 7/0802
See application file for complete search history.

(56) References Cited

U.S. PATENT DOCUMENTS

| | | |
|---|---|---|
| 2005/0141624 A1 | 6/2005 | Lakshmipathi |
| 2006/0149503 A1 | 7/2006 | Minor |
| 2009/0041149 A1 | 2/2009 | Sarris |
| 2009/0046800 A1 | 2/2009 | Xu |
| 2010/0087151 A1* | 4/2010 | Auer ............. H04L 5/0023 455/67.11 |
| 2010/0290552 A1 | 11/2010 | Sasaki |
| 2003/0308715 | 11/2013 | Nam |
| 2013/0308715 A1* | 11/2013 | Nam ............. H04B 7/0469 375/267 |
| 2014/0010153 A1 | 1/2014 | Kim |
| 2014/0187171 A1* | 7/2014 | Xiao ............. H04B 7/0617 455/67.11 |
| 2016/0080052 A1 | 3/2016 | Li |
| 2016/0323830 A1 | 11/2016 | Kim et al. |
| 2017/0214443 A1* | 7/2017 | Chen ............ H04B 7/0478 |

(Continued)

OTHER PUBLICATIONS

Kühl, "International Search Report," International Application No. PCT/US2017/062440, European Patent Office, Rijswijk, NL, Feb. 28, 2018.

(Continued)

*Primary Examiner* — Christine Ng
(74) *Attorney, Agent, or Firm* — Matthew C. Loppnow

(57) ABSTRACT

A method and apparatus determine parameters and conditions for line of sight MIMO communication. A transmitter can transmit reference symbols from a regularly spaced subset of a set of transmitting device antenna elements of the transmitter with elements spanning one or more spatial dimensions. The transmitter can signal transmit antenna element spacings in each dimension that can be used by the transmitter for data transmission.

22 Claims, 9 Drawing Sheets

(56) References Cited

U.S. PATENT DOCUMENTS

2018/0091198 A1* 3/2018 Zhang .................. H04B 7/0456
2018/0145407 A1   5/2018 Natsume

OTHER PUBLICATIONS

Bohagen F et al: "Construction and capacity analysis of high-rank line-of-sight MIMO channels", Wireless Communications and Networking Conference, 2005 IEEE New Orleans, LA, USA Mar. 13-17, 2005, Piscataway, NJ, USA, IEEE, vol. 1, Mar. 13, 2005 (Mar. 13, 2005).

NG, PTO-892 Notice of References Cited, U.S. Appl. No. 15/363,366, U.S. Patent and Trademark Office, dated Aug. 10, 2018.

Ng, Notice of References Cited, U.S. Appl. No. 15/363,366, U.S. Patent and Trademark Office, dated Nov. 26, 2018.

\* cited by examiner

METHOD AND APPARATUS FOR DETERMINING PARAMETERS AND CONDITIONS FOR LINE OF SIGHT MIMO COMMUNICATION

CROSS-REFERENCE TO RELATED APPLICATIONS

This application is related to an application entitled "Method and Apparatus for Determining Parameters and Conditions for Line of Sight MIMO Communication,"U.S. patent application Ser No. 15/363,324 and an application entitled "Method and Apparatus for Determining Parameters and Conditions for Line of Sight MIMO Communication", U.S. patent application Ser. No. 15/363,366, both filed on even date herewith and commonly assigned to the assignee of the present application, which are hereby incorporated by reference.

BACKGROUND

1. Field

The present disclosure is directed to a method and apparatus for determining parameters and conditions for line of sight Multiple Input Multiple Output (MIMO) communication.

2. Introduction

Presently, wireless communication devices communicate with other communication devices using wireless signals. Some communications, such as streaming video, video conferencing, webcams, streaming audio, large file transfers, and other data intensive communications, require high data rates that have been typically difficult to achieve using standard wireless communication technologies. Multiple Input Multiple Output (MIMO) devices provide high data rates without increasing power and bandwidth. These MIMO devices use multiple transmit and receive antennas to increase the capacity of a communication system and achieve high data rates. Unfortunately, MIMO devices do not know all of the necessary parameters and conditions for proper performance in a line of sight environment.

Thus, there is a need for a method and apparatus for determining parameters and conditions for line of sight MIMO communication.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
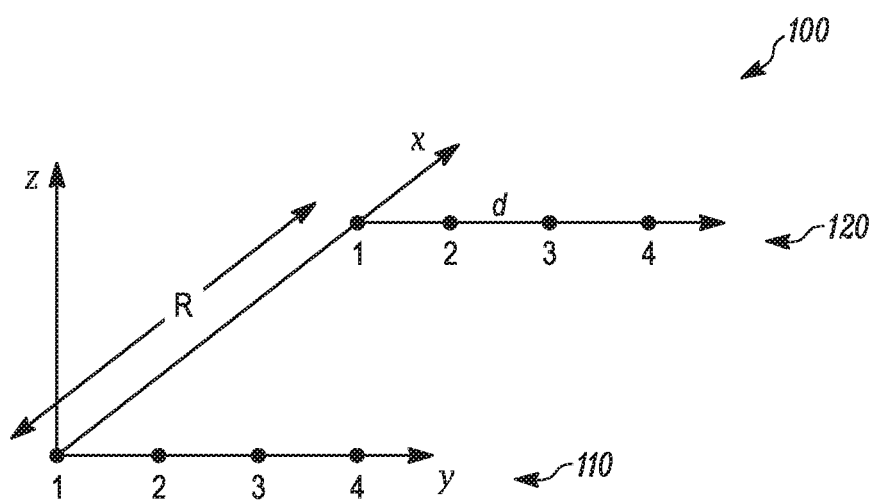
FIG. 1 is an example illustration of an antenna configuration at a transmitter and a receiver according to a possible embodiment.

Embodiments provide a method and apparatus for determining parameters and conditions for line of sight Multiple Input Multiple Output (MIMO) communication. According to a possible embodiment, reference signals can be received at a receiving device from a transmitting device. A channel matrix can be measured based on the reference signals. At least two of a first line of sight channel parameter, a second line of sight channel parameter, and a third line of sight channel parameter can be extracted based on the channel matrix. The first line of sight channel parameter can be based on transmitting device antenna element spacing. The second line of sight channel parameter can be based on a product of the transmitting device antenna element spacing and a receiving device antenna element spacing. The third line of sight channel parameter can be based on the receiving device antenna element spacing. The at least two line of sight channel parameters can be transmitted to the transmitting device.

According to another possible embodiment, a transmitter can transmit reference symbols from a regularly spaced subset of a set of transmitting device antenna elements of the transmitter with elements spanning one or more spatial dimensions. The transmitter can signal transmit antenna element spacings in each dimension that can be used by the transmitter for data transmission.

According to another possible embodiment, reference signals can be received from a transmitting device. Element spacings for each spatial dimension of an array of antennas at the transmitting device can be received. A channel matrix can be measured based on the reference signals. A line of sight channel parameter for each element spacing for each spatial dimension of the array of antennas at the transmitting device can be extracted based on the channel matrix. A spacing for antennas in the array of antennas in each spatial dimension can be selected that optimizes a capacity of a communication link.

According to another possible embodiment, reference signals can be received. A channel matrix can be measured based on the reference signals. A least-squared error estimate of the parameter representing phase angles of the measured channel matrix can be determined. A sum-squared error can be calculated based on the least-squared error estimate. The sum-squared error based on the least-squared error estimate can be compared to a threshold. The measured channel matrix can be ascertained to be classified as a line of sight multiple input multiple output channel based on comparing the sum-squared error based on the least-squared error estimate to the threshold.

According to another possible embodiment, an indication can be received that indicates a channel matrix is classified as a rank one line of sight channel The rank can also be estimated from the least squared estimate of the phase angles. An indication of a phase difference of reference signals transmitted from two different transmitter antennas to a single receive antenna can be received.

FIG. 1 is an example illustration 100 of an antenna configuration at a transmitter 110 and a receiver 120 according to a possible embodiment. The transmitter 110 and the receiver 120 can be any devices that can transmit and receive signals. For example, the transmitter 110 and/or the receiver 120 can be a User Equipment (UE), a base station, an enhanced Node B (eNB), a wireless terminal, a portable wireless communication device, a smartphone, a cellular telephone, a flip phone, a personal digital assistant, a device having a subscriber identity module, a personal computer, a selective call receiver, a tablet computer, a laptop computer, an access point, or any other device that is capable of sending and receiving communication signals on a wireless network.

The transmitter 110 can be assumed to be at the origin of the coordinate system and the receiver 120 can be on the x-axis and parallel to the y-axis. The separation between the transmitter 110 and the receiver 120, such as the link range, is R and the inter-element spacing is d. For derivation of a column orthogonality condition for line of sight MIMO, let y=Hx+w where y is the received signal vector, H is the channel matrix, $h_{m,n}$ is the element in the m-th row and i-th column of the matrix H and denotes the complex gain of the path from the n-th transmit element to the m-th receive element, x is the transmitted signal vector, and w is the white noise. In a purely Line of Sight (LOS) channel, the channel $h_{m,n}$ is given by $$h_{m,n} = \frac{\lambda}{4\pi p_{m,n}} \exp\left(-j\frac{2\pi}{\lambda} p_{m,n}\right)$$

where $p_{m,n}$ is given by $$p_{m,n} = \sqrt{R^2 + (nd_T - md_R)^2}$$

$$= R\sqrt{1 + \frac{(nd_T - md_R)^2}{R^2}}$$

$$\approx R\left(1 + \frac{(nd_T - md_R)^2}{2R^2}\right)$$

$$= R + \frac{(nd_T - md_R)^2}{2R}$$

where R is the link range, ▫_L and ▫_L denote the distance between neighboring receive antennas and transmit antennas, and λ is the wavelength.

With this distance approximation, we have that $$h_{m,n} = \frac{\lambda}{4\pi p_{m,n}} \exp\left(-j\frac{2\pi}{\lambda}\left(R + \frac{(nd_T - md_R)^2}{2R}\right)\right).$$

A sufficient condition to maximize the capacity of the channel H is for the columns to be orthonormal, such as both orthogonal and normalized. Note that with this condition, no precoding is needed to achieve channel capacity, since the set of channels from the transmit antennas to the receive array are orthogonal. This sufficient condition may or may not be a necessary condition for the channel matrix H to have both full rank and equal magnitude eigenvectors.

The conditions for the columns to be orthonormal can be determined by taking the inner product of the k-th and l-th columns of H. This inner product can be expressed as $$\langle h_{\cdot,k}, h_{\cdot,l} \rangle = \left(\frac{\lambda}{4\pi}\right)^2 \sum_{m=0}^{2N-1} \left(\frac{1}{p_{m,k} p_{m,l}}\right) \exp\left(-j\frac{2\pi}{\lambda}(p_{m,k} - p_{m,l})\right)$$

$$= \left(\frac{\lambda}{4\pi}\right)^2 \sum_{m=0}^{2N-1} \left(\frac{1}{p_{m,k} p_{m,l}}\right) \exp$$

$$\left(-j\frac{2\pi}{\lambda}\left(\left(R + \frac{(kd_T - md_R)^2}{2R}\right) - \left(R + \frac{(ld_T - md_R)^2}{2R}\right)\right)\right)$$

$$= \left(\frac{\lambda}{4\pi}\right)^2 \sum_{m=0}^{N-1} \frac{\exp\left(-j\frac{2\pi}{\lambda}\left(\left(R + \frac{(kd_T - md_R)^2}{2R}\right) - \left(R + \frac{(ld_T - md_R)^2}{2R}\right)\right)\right)}{\left(R + \frac{(kd_T - md_R)^2}{2R}\right)\left(R + \frac{(ld_T - md_R)^2}{2R}\right)}$$

$$= \left(\frac{\lambda}{4\pi}\right)^2 \sum_{m=0}^{N-1} \frac{\exp\left(-j\frac{\pi}{\lambda R}((kd_T - md_R)^2 - (ld_T - md_R)^2)\right)}{R^2 + \frac{1}{2}((kd_T - md_R)^2 + (ld_T - md_R)^2) + \frac{1}{4R^2}(kd_T - md_R)^2(ld_T - md_R)^2}$$

With the approximation that $$R^2 + \frac{1}{2}((kd_T - md_R)^2 + (ld_T - md_R)^2) + \frac{1}{4R^2}(kd_T - md_R)^2(ld_T - md_R)^2 \approx R^2$$

we have $$\langle h_{\cdot,k}, h_{\cdot,k} \rangle \approx \left(\frac{\lambda}{4\pi R}\right)^2 \sum_{m=0}^{2N-1} \exp\left(-j\frac{\pi}{\lambda R}((kd_T - md_R)^2 - (ld_T - md_R)^2)\right)$$

$$= \left(\frac{\lambda}{4\pi R}\right)^2 \sum_{m=0}^{2N-1} \exp$$

$$\left(-j\frac{\pi}{\lambda R}(k^2 d_T^2 - 2kmd_T d_R + m^2 d_R^2 - l^2 d_T^2 + 2lmd_T d_R - m^2 d_R^2)\right)$$

$$= \left(\frac{\lambda}{4\pi R}\right)^2 \exp\left(-j\frac{\pi}{\lambda R}(k^2 d_T^2 - l^2 d_T^2)\right) \sum_{m=0}^{N-1} \exp\left(-j\frac{2\pi m d_T d_R}{\lambda R}(l - k)\right)$$

$$= \left(\frac{\lambda}{4\pi R}\right)^2 \exp\left(-j\frac{\pi}{\lambda R}(k^2 d_T^2 - l^2 d_T^2)\right) \frac{1 - \exp\left(-j\frac{2\pi N d_T d_R}{\lambda R}(l - k)\right)}{1 - \exp\left(-j\frac{2\pi d_T d_R}{\lambda R}(l - k)\right)}$$

$$= \left(\frac{\lambda}{4\pi R}\right)^2 \exp\left(-j\frac{\pi}{\lambda R}(k^2 d_T^2 - l^2 d_T^2)\right) \cdot$$

$$\frac{\exp\left(-j\frac{\pi N d_T d_R}{\lambda R}(l - k)\right)\left(\exp\left(j\frac{\pi N d_T d_R}{\lambda R}(l - k)\right) - \exp\left(-j\frac{\pi N d_T d_R}{\lambda R}(l - k)\right)\right)}{\exp\left(-j\frac{\pi d_T d_R}{\lambda R}(l - k)\right)\left(\exp\left(j\frac{\pi d_T d_R}{\lambda R}(l - k)\right) - \exp\left(-j\frac{\pi d_T d_R}{\lambda R}(l - k)\right)\right)}$$

$$= \left(\left(\frac{\lambda}{4\pi R}\right)^2 \exp\left(-j\frac{\pi}{\lambda R}(k^2 d_T^2 - l^2 d_T^2)\right)\right) \exp$$

$$\left(-j\frac{\pi(N-1)d_T d_R}{\lambda R}(l - k)\right) \cdot \frac{\sin\left(\frac{\pi N d_T d_R}{\lambda R}(l - k)\right)}{\sin\left(\frac{\pi d_T d_R}{\lambda R}(l - k)\right)}$$

where N is the number of elements, such as antennas, in a transmit array of elements. So finally, we have $$\langle h_{\cdot,k}, h_{\cdot,l}\rangle \approx \left[\left(\frac{\lambda}{4\pi R}\right)^2 \exp\left(-j\frac{\pi}{\lambda R}(k^2 d_T^2 - l^2 d_T^2)\right)\right]$$

$$\exp\left(-j\frac{\pi(N-1)d_T d_R}{\lambda R}(l-k)\right) \cdot \frac{\sin\left(\frac{\pi N d_T d_R}{\lambda R}(l-k)\right)}{\sin\left(\frac{\pi d_T d_R}{\lambda R}(l-k)\right)}$$

It can be noted that the multiplicative phase terms do not affect the inner product when the orthogonality condition applies.

For l=k, we have $$\langle h_{\cdot,k}, h_{\cdot,k}\rangle \approx \left(\frac{\lambda}{4\pi R}\right)^2 N.$$

The condition for all columns of H to be orthonormal (within a scale factor) is that $$d_T d_R = \frac{\lambda R}{N}.$$

Figure 2:
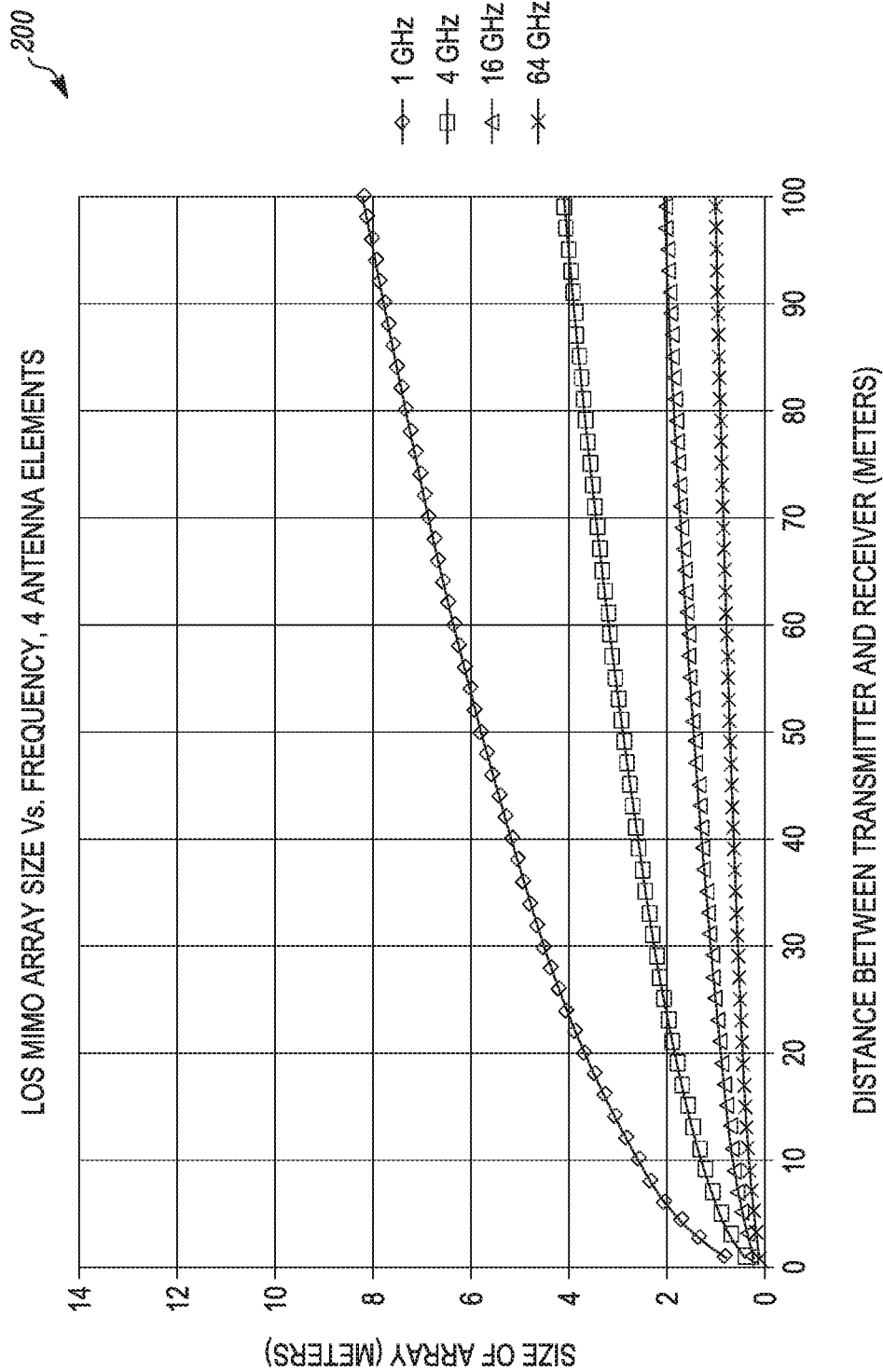
FIG. 2 is an example graph showing the size of a uniform linear antenna array with four elements.

FIG. 2 is an example graph 200 showing the size of a uniform linear antenna array with four elements needed for the columns of H to be orthonormal as a function the distance between the transmitter and receiver in meters, the carrier frequency in GHz, and the number of antenna elements in the array under the assumption that $d_T = d_R$ according to a possible embodiment.

Figure 3:
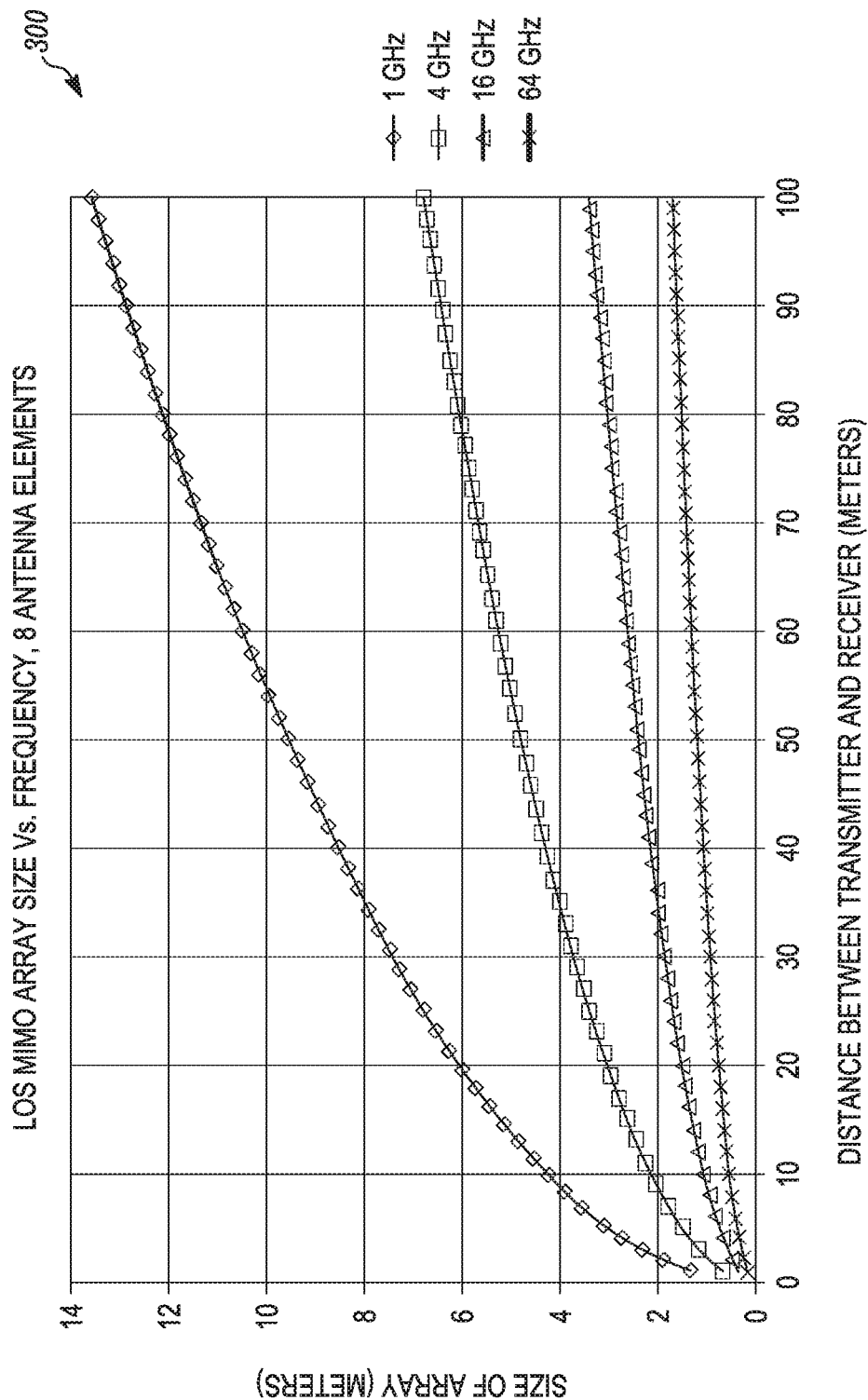
FIG. 3 is an example graph showing the size of a uniform linear antenna array with eight elements.

FIG. 3 is an example graph 300 showing the size of a uniform linear antenna array with eight elements needed for the columns of H to be orthonormal as a function the distance between the transmitter and receiver in meters, the carrier frequency in GHz, and the number of antenna elements in the array under the assumption that $d_T = d_R$ according to a possible embodiment.

As a first observation, there is no fundamental limit on the number of degrees of freedom N that can be achieved other than that $$\frac{N^2 d_T^2}{2R^2} << 1 \text{ and } \frac{N^2 d_R^2}{2R^2} << 1$$

As a second observation, $d_T$ and $d_R$ need not be equal. In particular, if area is more constrained at one end of the link, such as at a receiving device like a UE, than at a transmitting device, such as at an eNB, then smaller spacing can be used at the UE and larger spacing can be used at the eNB. For example, if the spacing of the elements at the eNB is doubled, the spacing of the elements at the UE can be halved.

As a third observation, when the columns of H are orthonormal, no precoding is needed to achieve channel capacity, and the power allocated to the symbol transmitted from each transmit antenna element should be equal assuming the noise at the receiver is independent and identically distributed (i.i.d.).

As a fourth observation, if $$d_T d_R = \frac{k\lambda R}{N}$$

for integer k, then columns of H will be orthogonal.

As a fifth observation, alternatively, if $$d_T d_R = \frac{\lambda R}{kN}$$

for integer k, then the columns of H that are k apart will be orthogonal. In this case, the rank of H is no less than $\lfloor N/K \rfloor$.

For the structure of a channel matrix for LOS-MIMO, the signal $y_k$ received at the k-th antenna is given by $$y_k =$$

$$\sum_{l=0}^{N-1} h_{k,l} x_l \approx \sum_{l=0}^{N-1} \frac{\lambda}{4\pi\left(R + \frac{(ld_T - kd_R)^2}{2R}\right)} \exp\left(-j\frac{2\pi}{\lambda}\left(R + \frac{(ld_T - kd_R)^2}{2R}\right)\right) x_l.$$

Using the previous approximation that $$R \approx R + \frac{(ld_T - kd_R)^2}{2R}$$

we have $$y_k \approx \frac{\lambda}{4\pi R} \sum_{l=0}^{N-1} \exp\left(-j\frac{2\pi}{\lambda}\left(R + \frac{(ld_T - kd_R)^2}{2R}\right)\right) x_l$$

$$= \frac{\lambda}{4\pi R} \exp\left(-j\frac{2\pi}{\lambda}\left(R + \frac{k^2 d_R^2}{2R}\right)\right) \sum_{l=0}^{N-1} \exp\left(j\frac{2\pi l k d_T d_R}{\lambda R}\right) \exp\left(-j\frac{\pi l^2 d_T^2}{\lambda R}\right) x_l$$

$$= \frac{\lambda}{4\pi R} \exp\left(-j\frac{2\pi R}{\lambda}\right) \exp\left(-j\frac{\pi k^2 d_R^2}{\lambda R}\right) \sum_{l=0}^{N-1} \exp\left(j\frac{2\pi l k d_T d_R}{\lambda R}\right) x_l'$$

where $$x_l' = \exp\left(-j\frac{\pi l^2 d_T^2}{\lambda R}\right) x_l$$

If we define the diagonal matrix B(z) to have diagonal elements given by $$B_{i,j}(z) = \exp(-j\pi i^2 z)$$

then we have $$x' = B\left(\frac{d_T^2}{\lambda R}\right) x.$$

We further define the matrix F(z) such that $$F_{i,j}(z) = \exp(j 2\pi i j z)$$

for $0 \leq i, j \leq N-1$, and the diagonal matrix $A(z)$ having diagonal elements given by $A_{i,j}(z) = \exp(-j\pi i^2 z)$.

With this notation, the received vector $y = [y_0 \, y_1 \, \ldots \, y_{N-1}]^T$ can be expressed as $$y \approx \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right) x$$
$$= Hx$$

where the channel matrix $H$ is given by $$H = \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right).$$

It can be noted that in the event that $$d_T d_R = \frac{\lambda R}{N}$$

the matrix $$F\left(\frac{d_T d_R}{\lambda R}\right)$$

becomes the Inverse Discrete Fourier Transform (IDFT) matrix of length N. In this case, the channel is essentially performing the Inverse Fast Fourier Transform (IFFT) of the transmitted data, though the input and output of the IDFT are multiplied by diagonal matrices with unit magnitude elements.

It can be shown that the singular values of $H$ are equal to the singular values of $$F\left(\frac{d_T d_R}{\lambda R}\right)$$

so that the singular values are completely determined by the value of $d_T d_R / \lambda R$ and do not depend on the values of $d_T/\sqrt{\lambda R}$ and $d_R/\sqrt{\lambda R}$ separately. The matrices $A(d_R^2/\lambda R)$ and $B(d_T^2/\lambda R)$ affect the left and right singular vectors of $H$, respectively, but do not affect the singular values.

The fundamental reason that LOS-MIMO works is that with the correct range and frequency dependent antenna spacing, the signal from each element of the transmit array is seen to arrive from a different direction at the receive array. As a result, the phase progression across the receive array is different for each element of the transmit array. With optimal spacing, this results in the received signal being the IDFT of the transmitted signal. Conversely, in the extreme far field, each element of the transmit array is seen to arrive from the same direction, and the phase progression across the receive array is the same for each transmit element.

As a first observation, since $$y \approx \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right) x$$

it follows that the demodulated signal is given by $$x \approx \frac{4\pi R}{\lambda} \exp\left(j\frac{2\pi R}{\lambda}\right) B^{-1}\left(\frac{d_T^2}{\lambda R}\right) F^{-1}\left(\frac{d_T d_R}{\lambda R}\right) A^{-1}\left(\frac{d_R^2}{\lambda R}\right) y$$

where $A^{-1}$ and $B^{-1}$ are diagonal matrices with unit magnitude elements and $F^{-1}$ is the DFT matrix when $d_T d_R/\lambda R = (1/N)$.

As a second observation, it can be observed that within a complex scale factor, the matrix $H$ is completely determined by three parameters $$\frac{d_T d_R}{\lambda R}, \, \frac{d_T^2}{\lambda R}, \, \text{and} \, \frac{d_R^2}{\lambda R}.$$

While the transmitter and receiver may know the spacing of their elements, in the general case in which the linear arrays at the transmitter and the receiver are not exactly aligned, it is not the distance between elements that matters, but a projection of this distance that depends on the relative orientation of the linear arrays at the transmitter and the receiver. Furthermore, the transmitter and receiver will not in general know the range R.

As a third observation, if $U$ and $V$ denote the left and right singular vectors of $F$, respectively, then the left and right singular vectors of the product $$A\left(\frac{d_R^2}{\lambda R}\right) F\left(\frac{d_T d_R}{\lambda R}\right) B\left(\frac{d_T^2}{\lambda R}\right)$$

are given by the columns of $\tilde{U}$ and $\tilde{V}$, where $$\tilde{U} = A\left(\frac{d_R^2}{\lambda R}\right) U, \, \text{and} \, \tilde{V} = B\left(\frac{-d_T^2}{\lambda R}\right) V.$$

It should be noted that the columns of $\tilde{V}$ are the optimal set of precoders to use on the forward link, and the columns of $\tilde{U}$ are the optimal set of precoders to use for the reverse link. Thus, it is sufficient for the transmitter to be able to compute the Singular Value Decomposition (SVD) of matrices of the form $F(d_T d_R/\lambda R)$, where this matrix is an IFFT matrix if $d_T d_R/\lambda R = (1/N)$, and is otherwise a Vandermonde matrix. In general, the transmitter only needs to know how to perform the SVD of a Vandermonde matrix.

As a fourth observation, the optimal precoders and power allocation for the forward link only depend on knowledge of the parameters $$\frac{d_T d_R}{\lambda R} \, \text{and} \, \frac{d_T^2}{\lambda R}$$

while the optimal precoders and power allocation for the reverse link depend on knowledge of the parameters $$\frac{d_T d_R}{\lambda R} \, \text{and} \, \frac{d_R^2}{\lambda R}.$$

Again, while the transmitter may know the spacing of the elements $d_T$ and the wavelength $\lambda$, the transmitter may not know the range, and furthermore may not know the needed projection of this distance that depends on the relative orientation of the linear arrays at the transmitter and the receiver.

There are multiple reasons it can be useful to be able to solve for the parameters of the LOS-MIMO channel One reason it can be useful to be able to solve for these parameters is that when the singular values of the LOS-MIMO channel are equal, capacity can be achieved with any orthogonal set of precoders. However, when the singular values are not equal, the optimal precoders and power allocation can depend on the parameters identified above. In general, the channel will rarely have the normalized element spacing (normalized by the product of the wavelength and the range) needed for equal singular values, and so it can be useful to solve for the parameters $$\frac{d_T d_R}{\lambda R}, \frac{d_T^2}{\lambda R}, \text{ and } \frac{d_R^2}{\lambda R}$$

from the measured channel matrix in order to identify the optimal set of precoders, the rank that should be used, and the power allocation. It can be noted that even if the receiver knows the inter-element spacing of both the transmitter and the receiver, it will not in general know the range R. Also, even if the inter-element spacing and the range is known, the projection of these distances onto the plane perpendicular to the line between the transmitter and receiver may not be known, and furthermore, the alignment of the projections of the linear array onto this plane may also not be known. Therefore, it is unlikely that the parameters will be known at the transmitter and receiver, and as a result, it can be useful for the parameters to be extracted from channel measurements.

Another reason it can be useful to be able to solve for the parameters of the LOS-MIMO channel is that even if the channel is LOS, in the case that $$R \gg \frac{N d_T d_R}{\lambda}$$

the rank of the channel matrix will be approximately one, and LOS-MIMO will not be possible. Thus it can be useful to determine when the LOS-MIMO condition exists.

Another reason it can be useful to be able to solve for the parameters of the LOS-MIMO channel is that for a Frequency Division Duplex (FDD) system, reciprocity may not be assumed due to the frequency difference between the forward and reverse links. However, for the MIMO LOS condition, the receiver can signal back to the transmitter that the LOS condition exists along with the parameters $$\frac{d_T d_R}{\lambda R}, \frac{d_T^2}{\lambda R}, \text{ and } \frac{d_R^2}{\lambda R}.$$

Alternatively, if the LOS-MIMO condition exists on the received link, it can be assumed to exist on the transmit link. Furthermore, the parameters for the transmit link can be calculated by correcting for the frequency difference.

Another reason it can be useful to be able to solve for the parameters of the LOS-MIMO channel is that for a FDD system, the channel can be characterized as (i) far-field LOS, (ii) LOS-MIMO, or (iii) fading (neither far-field LOS nor LOS-MIMO). Very little channel feedback is needed for cases (i) and (ii). The optimal precoders for far-field LOS are already contained in the 3GPP standard (or nearly so). For the LOS-MIMO channel, the precoders can be determined by the values of the parameters $$\frac{d_T d_R}{\lambda R}, \frac{d_T^2}{\lambda R}, \text{ and } \frac{d_R^2}{\lambda R}.$$

Note that it would not be necessary to signal the channel matrix or the eigenvectors of the channel matrix to the transmitter. Instead, it may only be necessary to signal the above parameters from the receiver to the transmitter. Furthermore, the receiver can be able to determine the precoders used by the transmitter from the parameter values that it signaled to the transmitter. These values could be quantized in some agreed way. The receiver can signal, to the transmitter several bits to indicate that the channel is LOS-MIMO and quantized values of the parameters $$\frac{d_T d_R}{\lambda R}, \frac{d_T^2}{\lambda R}, \text{ and } \frac{d_R^2}{\lambda R}.$$

It may only be necessary to signal two of the three parameters, as the third parameter can be determined from the two other parameters using the relation $$\frac{d_T d_R}{\lambda R} = \sqrt{\frac{d_T^2}{\lambda R} \frac{d_R^2}{\lambda R}}.$$

For a minimum least-squared error estimate of the LOS Channel Parameters, as noted above, for the LOS-MIMO channel the channel matrix is given by $$H = \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right).$$

Let the K×L matrix $\hat{H}$ denote the channel measured using reference symbols, which is given by $$\hat{H} = H + N$$

and N is a K×L matrix of i.i.d. complex Gaussian random variables of variance $\sigma^2$. Let the K×L matrix $\angle \hat{H}$ denote phases of the elements of $\hat{H}$ measured in radians. Let the (K−1)×L matrix $\Delta_R(\angle \hat{H})$ denote the matrix with k-th row equal to the result of subtracting the k-th row of $\angle \hat{H}$ from the k+1-th row of $\angle \hat{H}$. The matrix $\Delta_R(\angle \hat{H})$ can also be computed by dividing the k+1-th row of $\hat{H}$ by the k-th row of $\hat{H}$ and taking the phase of each element of the resulting (K−1)×L matrix. The matrix $\Delta_R(\angle \hat{H})$ is given by $$\Delta_R(\angle \hat{H}) =$$

$$-\pi \cdot \begin{bmatrix} \frac{d_R^2}{\lambda R} & \frac{d_R^2}{\lambda R} - 2\frac{d_T d_R}{\lambda R} & \cdots & \frac{d_R^2}{\lambda R} - 2(L-1)\frac{d_T d_R}{\lambda R} \\ 3\frac{d_R^2}{\lambda R} & 3\frac{d_R^2}{\lambda R} - 2\frac{d_T d_R}{\lambda R} & \cdots & \cdots \\ \cdots & \cdots & \cdots & \cdots \\ (2K-1)\frac{d_R^2}{\lambda R} & \cdots & \cdots & (2K-1)\frac{d_R^2}{\lambda R} - 2(L-1)\frac{d_T d_R}{\lambda R} \end{bmatrix} + N_R$$

where the $K-1 \times L$ matrix $N_R$ denotes the noise in the calculation of the phase differences between rows.

Let $\Delta_R^S(\angle \hat{H})$ denote the stacked columns of $\Delta_R(\angle \hat{H})$, and let $N_R^S$ denote the stacked columns of $N_\angle$. We then have that $$\Delta_R^S(\angle \hat{H}) = -\pi \begin{bmatrix} 1 & 0 \\ 3 & 0 \\ \vdots & \vdots \\ 2K-1 & 0 \\ 1 & -2 \\ 3 & -2 \\ \vdots & \vdots \\ 2K-1 & -2 \\ \vdots & \vdots \\ \vdots & \vdots \\ 1 & -2(L-1) \\ 3 & -2(L-1) \\ \vdots & -2(L-1) \\ 2K-1 & -2(L-1) \end{bmatrix} \begin{bmatrix} \frac{d_R^2}{\lambda R} \\ \frac{d_T d_R}{\lambda R} \end{bmatrix} + N_R^S = W_R \begin{bmatrix} \frac{d_R^2}{\lambda R} \\ \frac{d_T d_R}{\lambda R} \end{bmatrix} + N_R^S$$

where the $(K-1)L \times 2$ matrix $W^R$ is implicitly defined from the above equation.

This system of equation is highly over-determined since we have $(K-1)L$ equations with only two unknowns. With the formulation, the least-squared error estimate of the parameters $$\frac{d_T d_R}{\lambda R} \text{ and } \frac{d_R^2}{\lambda R}$$

is given by $$\begin{bmatrix} \frac{d_R^2}{\lambda R} \\ \frac{d_T d_R}{\lambda R} \end{bmatrix}_{LSE} = (W_R^H W_R)^{-1} W_R^H \Delta_R^S(\angle \hat{H}).$$

The sum Mean-Squared Error (MSE) of the least-squares estimate is given by $$MSE\left(\begin{bmatrix} \frac{d_R^2}{\lambda R} \\ \frac{d_T d_R}{\lambda R} \end{bmatrix}_{LSE}\right) = E[(N_R^S)^H W_R^H W_R N_R^S].$$

Evaluation of the sum mean-squared error can depend on knowledge of the joint statistics of the noise vector $N_R^S$ which may be difficult to estimate. Alternatively, the Sum-Squared Error (SSE) of the least-squared error estimate can be directly computed as $$SSE\left(\begin{bmatrix} \frac{d_R^2}{\lambda R} \\ \frac{d_T d_R}{\lambda R} \end{bmatrix}_{LSE}\right) = (\Delta_R^S(\angle \hat{H}))^H (I_{(K-1)L} - W_R(W_R^H W_R)^{-1} W_R^H) \Delta_R^S(\angle \hat{H})$$

where $I_{(K-1)L}$ denotes a square identity matrix of dimension $(K-1)L$. It should be noted that since the matrix $W^R$ does not depend on the measured channel, the matrix $W_R(W_R^H W_R)^{-1} W_R^H$ can be pre-computed. The computed sum-squared error can be compared to a threshold to determine whether or not the measured channel $\hat{H}$ can be properly classified as an LOS-MIMO channel The procedure for jointly estimating the parameters $$\frac{d_T d_R}{\lambda R} \text{ and } \frac{d_R^2}{\lambda R}$$

is very similar to the method above for jointly estimating $$\frac{d_T d_R}{\lambda R} \text{ and } \frac{d_R^2}{\lambda R}.$$

To begin, let the matrix $K \times (L-1)$ matrix $\Delta_C(\angle \hat{H})$ denote the matrix with k-th row equal to the result of subtracting the l-th column of $\angle \hat{H}$ from the l+1-th column of $\angle \hat{H}$. The matrix $\Delta_C(\angle \hat{H})$ can also be computed by dividing the l+1-th column of $\hat{H}$ by the l-th column of $\hat{H}$ and taking the phase of each element of the resulting $K \times (L-1)$ matrix. The matrix $\Delta_C(\angle \hat{H})$ is given by $$\Delta_C(\angle \hat{H}) =$$

$$-\pi \begin{bmatrix} \frac{d_T^2}{\lambda R} - 2\frac{d_T d_R}{\lambda R} & 3\frac{d_T^2}{\lambda R} - 2\frac{d_T d_R}{\lambda R} & \cdots & (2L-1)\frac{d_T^2}{\lambda R} - 2\frac{d_T d_R}{\lambda R} \\ \frac{d_T^2}{\lambda R} - 4\frac{d_T d_R}{\lambda R} & 3\frac{d_T^2}{\lambda R} - 24\frac{d_T d_R}{\lambda R} & \cdots & \cdots \\ \cdots & \cdots & \cdots & \cdots \\ \frac{d_T^2}{\lambda R} - 2K\frac{d_T d_R}{\lambda R} & \cdots & \cdots & (2L-1)\frac{d_T^2}{\lambda R} - 2K\frac{d_T d_R}{\lambda R} \end{bmatrix} + N_C$$

where the $K-1 \times L$ matrix $N_C$ denotes the noise in the calculation of the phase differences between columns.

Let $\Delta_C^S(\angle \hat{H})$ denote the stacked columns of $\Delta_C(\angle \hat{H})$, and let $N_C^S$ denote the stacked columns of $N_C$. We then have that $$\Delta_C^S(L\hat{H}) = -\pi \begin{bmatrix} 1 & -2 \\ 1 & -4 \\ \vdots & \vdots \\ 1 & -2K \\ 3 & -2 \\ 3 & -4 \\ \vdots & \vdots \\ 3 & -2K \\ \vdots & \vdots \\ \vdots & \vdots \\ \vdots & \vdots \\ 2L-1 & -2 \\ 2L-1 & -4 \\ \vdots & \vdots \\ 2L-1 & -2K \end{bmatrix} \begin{bmatrix} \frac{d_T^2}{\lambda R} \\ \frac{d_T d_R}{\lambda R} \end{bmatrix} + N_C^S = W_C \begin{bmatrix} \frac{d_T^2}{\lambda R} \\ \frac{d_T d_R}{\lambda R} \end{bmatrix} + N_C^S$$

where the K(L−1)×2 matrix $W_C$ is implicitly defined from the above equation. Following the analysis above, the least-squared error estimate of the parameters $$\frac{d_T d_R}{\lambda R} \text{ and } \frac{d_T^2}{\lambda R}$$

is given by $$\begin{bmatrix} \frac{d_T^2}{\lambda R} \\ \frac{d_T d_R}{\lambda R} \end{bmatrix}_{LSE} = (W_C^H W_C)^{-1} W_C^H \Delta_C^S(L\hat{H})$$

The sum mean-squared error (MSE) of the least-squares estimate is given by $$MSE\left(\begin{bmatrix} \frac{d_T^2}{\lambda R} \\ \frac{d_T d_R}{\lambda R} \end{bmatrix}_{LSE}\right) = E[(N_C^S)^H W_C^H W_C N_C^S].$$

Evaluation of the sum mean-squared error can depend on knowledge of the joint statistics of the noise vector $N_C^S$ which may be difficult to estimate. Alternatively, the SSE of the least-squared error estimate can be directly computed as $$SSE\left(\begin{bmatrix} \frac{d_T^2}{\lambda R} \\ \frac{d_T d_R}{\lambda R} \end{bmatrix}_{LSE}\right) = (\Delta_C^S(L\hat{H}))^H (I_{(L-1)K} - W_C(W_C^H W_C)^{-1} W_C^H) \Delta_C^S(L\hat{H})$$

where $I_{(K-1)L}$ denotes a square identity matrix of dimension (L−1)K. It should be noted that since the matrix $W_C$ does not depend on the measured channel, the matrix $W_C(W_C^H W_C)^{-1} W_C^H$ can be pre-computed. The computed sum-squared error can be compared to a threshold to determine whether or not the measured channel $\hat{H}$ can be properly classified as an LOS-MIMO channel.

It should be noted that with the two estimators, we now have two estimates for the parameter $$\frac{d_T d_R}{\lambda R}.$$

Several possibilities exist for choosing the best estimate of this parameter, and these include at least averaging the two estimates and choosing the estimate for which the least-squares error is smaller.

It may also be beneficial to iterate between the two estimators and use the first estimate for this parameter from the first estimator as in input to the second estimator, where the second estimator is modified to compute the least-squares estimate of the second parameter given knowledge of the first parameter.

According to a possible embodiment, for a Time Division Duplex (TDD) system, channel reciprocity should apply, so the forward channel can be learned from reference symbols sent on the reverse channel In this case there is no need for the transmitter to explicitly extract the parameters $$\frac{d_T d_R}{\lambda R} \text{ and } \frac{d_T^2}{\lambda R}$$

since it can measure $H^T$ from the reverse link reference symbols, and subsequently compute the right singular vectors of H. For an FDD system, if the wavelength of the forward link is $\lambda_1$, and the wavelength of the reverse link is $\lambda_2$, then the transmitter measures $H^T(\lambda_2)$ on the reverse link and can compute $H(\lambda_1)$.

In the absence of noise, the parameters $$\frac{d_T d_R}{\lambda_2 R}, \frac{d_T^2}{\lambda_2 R}, \text{ and } \frac{d_R^2}{\lambda_2 R}$$

can be determined exactly from $H^T(\lambda_2)$. With additive noise, a least-squares and/or iterative formulation can be used to solve for these parameters. From these parameters, the $H(\lambda_1)$ parameters can be computed as $$\frac{d_T d_R}{\lambda_1 R} = \left(\frac{\lambda_2}{\lambda_1}\right)\left(\frac{d_T d_R}{\lambda_2 R}\right)$$

$$\frac{d_T^2}{\lambda_1 R} = \left(\frac{\lambda_2}{\lambda_1}\right)\left(\frac{d_T^2}{\lambda_2 R}\right)$$

$$\frac{d_R^2}{\lambda_2 R} = \left(\frac{\lambda_2}{\lambda_1}\right)\left(\frac{d_R^2}{\lambda_2 R}\right).$$

According to another possible related embodiment, in an FDD system, let the receiver solve for $$\frac{d_T d_R}{\lambda_1 R} \text{ and } \frac{d_T^2}{\lambda_1 R}$$

from $H(\lambda_1)$ measured using reference symbols and signal these two real-valued parameters back to the transmitter. This is all the information the transmitter needs in order to determine both the singular values and the singular vectors used to optimize channel capacity.

According to another possible related embodiment, the transmitter and/or receiver can have some ability to control the element spacing. One such example can be the case of a linear array that can be rotated as a whole. An alternative example can be a case of a larger array for which only a subset of the elements are used.

The receiver can measure the forward channel H from reference symbols sent on the forward channel From the measured H, the receiver can solve for $$\frac{d_T d_R}{\lambda R}$$

and this value can be signaled to the transmitter. Alternatively, the transmitter can solve for $$\frac{d_T d_R}{\lambda R}$$

using reference symbols transmitted on the reverse link.

The transmitter and/or receiver can then adjust the rotation of the array to improve the spacing of the elements relative to the orientation of the transmitter and receiver. Alternatively, the transmitter and/or receiver can change the subset of antenna elements (from a presumed larger array) which are used to transmit and/or receive. If only one of the transmitter and/or receiver have the ability to change the effective inter-element spacing, then this can be done without collaboration between the devices. Alternatively, if both the transmitter and the receiver have the capability to adjust the inter-element spacing, then the transmitter and the receiver can agree on how each will adjust its spacing to optimize the parameter $$\frac{d_T d_R}{\lambda R}.$$

According to another possible related embodiment, it may be that the small cell eNB or Access Point (AP) has K antennas while the UE has L antennas, where K>L. The UE can then determine the subset of L eNB or AP antennas which yields the best LOS capacity and signal this set back to the eNB or AP.

According to another possible related embodiment, the eNB and the UE can have some flexibility in the selection of the frequency over which they operate. The receiver can measure the channel $H(\lambda_1)$ using references symbols. From this, the receiver can extract the parameter $$\frac{d_T d_R}{\lambda_1 R}$$

Given a set of additional allowed frequencies $\lambda_2, \lambda_3, \ldots, \lambda_N$, the receiver can then evaluate the parameter over this set in the following manner $$\frac{d_T d_R}{\lambda_k R} = \left(\frac{\lambda_1}{\lambda_k}\right)\left(\frac{d_T d_R}{\lambda_1 R}\right)$$

and then can select the wavelength $\lambda^*$ from this set which yields the channel $H(\lambda^*)$ with the largest capacity. The set of allowed frequencies can be known by the receiver or can be signaled from the transmitter. Alternatively, the receiver can signal $$\frac{d_T d_R}{\lambda_1 R}$$

to the transmitter and let the transmitter perform the frequency optimization.

According to another possible related embodiment, the transmitter can transmit reference symbols over a regularly spaced subset of its antennas. The receiver can then measure $$\frac{d_T d_R}{\lambda R}$$

from this regularly spaced subset. The transmitter can inform the receiver of the additional transmit element spacings that can be used by the transmitter, where this information can be signaled in the form of ratios to the spacing that was used for the references symbols. For example, the transmitter can signal that transmit element spacings equal to one-half and twice the spacing of that used for the reference symbols are possible. The receiver can compute $$\frac{k_i d_T d_R}{\lambda R}$$

for each allowed scaling of the spacing $k_i$, and can signal the spacing that maximizes channel capacity back to the transmitter. Alternatively, the receiver can signal the measurement $$\frac{d_T d_R}{\lambda R}$$

to the transmitter, and the transmitter can select the scaling $k_i$ of the element spacing that maximizes channel capacity.

The parameters $$\frac{d_T d_R}{\lambda R}, \frac{d_T^2}{\lambda R}, \text{ and } \frac{d_R^2}{\lambda R}$$

can be computed, for example, with the least-squared error method given above, as long as the receiver receives reference symbols from at least two transmit antennas. The parameters are then known for the spacing of the elements that were used, and the parameters for any other allowed element spacing at the transmitter or the receiver can be determined from these measurements.

According to another possible related embodiment, in the case that the transmitter has uniform linear arrays spanning multiple dimensions, the transmitter can transmit reference symbols from a regularly spaced subset of the elements in each dimension. The transmitter can also inform the receiver of the additional transmit element spacings that can be used by the transmitter for each dimension, where this information can be signaled in the form of ratios to the spacing that was used for the references symbols. The receiver can then measure $$\frac{d_T d_R}{\lambda R}$$

for each dimension. The receiver then can compute this parameter for each allowed element spacing for each dimension of the transmit array and can select the spacing for each dimension which optimizes the capacity. Alternatively, receiver can measure $$\frac{d_T d_R}{\lambda R}$$

from reference symbols transmitted from the regularly spaced subset of the elements in each dimension, and can signal these measurements back to the transmitter. The transmitter then can select the element spacing in each dimension that maximizes the link capacity.

According to another possible related embodiment, in the case of CoOrdinated Multi-Point (COMP) transmission points or remote radio-heads, the transmission points can be selected for which the parameter $$\frac{d_T d_R}{\lambda R}$$

is most nearly equal to 1/N or an integer multiple of 1/N, or more generally, for which the resulting LOS channel capacity is maximized. For this case $d_T$ is the distance between transmission points, possibly projected onto a line orthogonal to a line between the midpoint of the transmission points and the receiver.

According to another possible related embodiment, in the case that $$\frac{d_T d_R}{\lambda R} = \frac{1}{N}$$

channel H has full rank and the singular values are all equal. In this case full rank transmission can be used. Furthermore, there is no restriction on the precoders, as any orthonormal set of precoders can achieve capacity. In this case, it is possible to enable a simplified receiver by inverting the channel and taking the DFT of the data prior to transmission. The output of the DFT can have the same average power as its input, but the peak power can significantly greater. Conversely, the diagonal matrices have no impact on peak or average power as the diagonal elements all have unit magnitude.

If the input to the channel is the transform x' of x defined as $$x' = B^{-1}\left(\frac{d_T^2}{\lambda R}\right) F^{-1}\left(\frac{d_T d_R}{\lambda R}\right) A^{-1}\left(\frac{d_R^2}{\lambda R}\right) x,$$

then the output of the channel is given by $$y = \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right) x'$$

$$= \frac{\lambda}{4\pi R} \exp\left(-j\frac{2\pi R}{\lambda}\right) A\left(\frac{d_R^2}{\lambda R}\right) F\left(\frac{d_T d_R}{\lambda R}\right) B\left(\frac{d_T^2}{\lambda R}\right) B^{-1}\left(\frac{d_T^2}{\lambda R}\right)$$

$$F^{-1}\left(\frac{d_T d_R}{\lambda R}\right) A^{-1}\left(\frac{d_R^2}{\lambda R}\right) x$$

$$= \frac{\lambda}{4\pi R} \exp\left(-j\frac{2\pi R}{\lambda}\right) x,$$

so that the output of the channel is equal to the data x multiplied by a complex scalar.

According to another possible related embodiment, based on measurements of the channel $\hat{H}$ using reference symbols, the channel can be classified as a channel type and channel parameters can be sent that correspond to the channel type. For example, as mentioned above, the channel can be classified as (i) rank one LOS, (ii) LOS-MIMO, or (iii) fading (neither (i) or (ii)).

If the receiver determines that the channel is rank one LOS, it can signal rank one LOS to the transmitter. It can then measure the phase difference of the reference symbols transmitted from two different antennas when measured at a single receive antenna. With this information, the transmitter can co-phase the signals from the two transmit antennas to arrive in phase at the receiver. As noted above, only two reference symbols are required to determine the phasing for any number of transmit antennas so long the distance of each additional antenna element from one of the antennas used to transmit the reference symbols is known, though this distance can be normalized by the distance between the two antennas used to transmit the two reference symbols.

If the receiver determines the channel is LOS-MIMO, it can signal back LOS-MIMO to the transmitter along with the coefficients $$\frac{d_T d_R}{\lambda R} \text{ and } \frac{d_T^2}{\lambda R}$$

If the receive determines that the channel is neither rank one LOS nor LOS-MIMO, the receiver can signal this back to the transmitter. The receiver can also signal back the channel measurements, and/or the precoder and rank to use for transmission. For an extension of the above case to a planar array with N×N antennas with total of $N^2$ antennas per planar array, using a Taylor series approximation as in the uniform linear array case, we get $$H_{2d\_Nm_1+m_2,Nn_1+n_2} =$$

$$\frac{\lambda}{4\pi R} \exp\left(-j\frac{2\pi}{\lambda}\left(R + \frac{(n_1 d_T - m_1 d_R)^2}{2R} + \frac{(n_2 d_T - m_2 d_R)^2}{2R}\right)\right);$$

where N is the number of antennas in each dimension, where $(m_1, m_2)$ are the co-ordinates of receiver array and $(n_1, n_2)$ are the coordinates of the transmitter array. One restriction on this equation can be that the x and y axes of the first array are parallel with the x and y axes of the second array (note that with this restriction, the planes containing the arrays are parallel).

It can be easily seen that if we discard the terms $\lambda/4\pi R$ and $\exp(-j2\pi R/\lambda)$ since these terms are scalars and are the same for all the elements of the matrices then new matrix $H_{2d}$ for the planar case is the Kronecker product of matrices corresponding to uniform linear array case, i.e, $$H_{2d} = H \otimes H.$$

It can be noted that if $\hat{H}_{2d}$ is measurement of the $N^2 \times N^2$ channel based on reference symbols, then the N×N submatrix $$H_{2d\_Nm_1+m_2,Nm_1+n_2} = \frac{\lambda}{4\pi R} \exp\left(-j\frac{2\pi}{\lambda}\left(R + \frac{(n_2 d_T - m_2 d_R)^2}{2R}\right)\right)$$

for $n_1 = m_1$ is a measurement of $\hat{H}$, for each value of $m_1$. Since there are N such measurements, these measurements can be averaged to form an improved average $\hat{H}$. Similarly, the N×N sub-matrix $$H_{2d\_Nm_1+m_2 Nn_1+m_2} = \frac{\lambda}{4\pi R} \exp\left(-j\frac{2\pi}{\lambda}\left(R + \frac{(n_1 d_T - m_1 d_R)^2}{2R}\right)\right)$$

for $n_2 = m_2$ is also a measurement of $\hat{H}$, for each value of $m_2$. Since there are N such measurements, these measurements can be averaged to form an improved average $\hat{H}$. Furthermore, first and second estimates can be averaged to form an improved estimate.

As indicated previously in the case of one-dimensional arrays, the three parameters $$\frac{d_T d_R}{\lambda R}, \frac{d_T^2}{\lambda R}, \text{ and } \frac{d_R^2}{\lambda R}$$

can be estimated from the measurements of $\hat{H}$. Finally, the full $N^2 \times N^2$ channel $H_{2d}$ can be completely specified from any two of these three parameters, since any two parameters can be used to generate the third parameter. Thus, it may be only necessary to signal two parameters back to the transmitter to fully specify the channel The singular values of $H_{2d}$ are the all possible product pairs of the singular values of H and the left singular vectors are obtained using the Kronecker product of the left singular vectors of H and the right singular vectors are obtained using the Kronecker product of right singular vectors of H. It can be thus seen that all the ideas relevant for the uniform linear array can be easily extended to the planar array. Since the eigenvectors of a planar array are the Kronecker product of the eigenvectors of the linear array, one of the advantages of the planar array is that we can perform a singular value decomposition over a much smaller matrix.

For the case $$\frac{d_T d_R}{\lambda R} = \frac{1}{N},$$

all the eigenvalues of H have unit magnitude and hence all the eigenvalues of $H_{2d}$ are also of unit magnitude. The matrix $H_{2d}$ has $N^2$ unit magnitude eigenvalues while H has only N unit magnitude eigenvalues.

Let us now compare the dimensions of a uniform linear array with a planar array such that they have the same capacity (same number of unit magnitude eigenvalues). The system is supposed to be designed as optimum for a given distance R. Let $L_{Tu}$ and $L_{Ru}$ be the linear dimension of the Uniform Linear Array (ULA) transmitter and receiver, respectively, and $L_{Tp} \times L_{Tp}$, and $L_{Rp} \times L_{Rp}$ be the dimensions of the planar array transmitter and receiver, respectively. For equal capacity both systems should have equal number of antennas thus there are $N^2$ antenna in the ULA. It can be shown using $d_{Tu} = L_{Tu}/(N^2-1)$ and $d_{Tp} = L_{Tp}/(N-1)$ that:

$$L_{Tu} L_{Ru} = \frac{(N+1)^2}{N} L_{Tp} L_{Rp},$$

thus, the dimension of linear array should be sqrt(N) times the linear dimension of the planar array. The max distance from the center of the antenna array to the farthest antenna is sqrt(N/2) times more in a linear array than in a planar array. Hence, it is more likely for a linear array to not satisfy the constraints used for the distance approximations used to determine the phase of the different signal paths to be correct $$\frac{N^2 d_T^2}{2R^2} \ll 1 \text{ and } \frac{N^2 d_R^2}{2R^2} \ll 1$$

For a general orientation of linear arrays, the distance $r_{m,n}$ between the m-th element of the first array and the n-th element of the second array can be expressed as $$\begin{aligned}
r_{m,n} &= \left[\begin{array}{l}(R + md_R \sin\theta_r \cos\phi_r - nd_t \sin\theta_t)^2 + (md_R \sin\theta_r \sin\phi_r)^2 + \\ (md_R \cos\theta_r - nd_t \cos\theta_t)^2\end{array}\right]^{1/2} \\
&= R\left[\begin{array}{l}(1 + R^{-1}(md_R \sin\theta_r \cos\phi_r - nd_T \sin\theta_t))^2 + R^{-2}(md_R \sin\theta_r \sin\phi_r)^2 \\ R^{-2}(md_R \cos\theta_r - nd_T \cos\theta_t)^2\end{array}\right]^{1/2} \\
&\approx R\left[\begin{array}{l}1 + m^2 d_R^2 R^{-2}(\sin^2\theta_r \sin^2\phi_r + \cos^2\theta_r) + n^2 d_T^2 R^{-2} \cos^2\theta_t - \\ 2mnd_R d_T R^{-2} \cos\theta_r \cos\theta_t + 2md_R R^{-1} \sin\theta_r \cos\phi_r - 2nd_T R^{-1} \sin\theta_t\end{array}\right]^{1/2} \\
&= R\left[\begin{array}{l}1 + R^{-2}(m^2 d_R^2(\sin^2\theta_r \sin^2\phi_r + \cos^2\theta_r) + n^2 d_T^2 \cos^2\theta_t) - \\ 2mnd_R d_T R^{-2} \cos\theta_r \cos\theta_t + 2md_R R^{-1} \sin\theta_r \cos\phi_r - 2nd_T R^{-1} \sin\theta_t\end{array}\right]^{1/2} \\
&= R\left[\begin{array}{l}1 + R^{-2}(m^2 d_R^2(1 - \sin^2\theta_r \cos^2\phi_r) + n^2 d_T^2 \cos^2\theta_t) - \\ 2mnd_R d_T R^{-2} \cos\theta_r \cos\theta_t + 2md_R R^{-1} \sin\theta_r \cos\phi_r - 2nd_T R^{-1} \sin\theta_t\end{array}\right]^{1/2} \\
&\approx R + \frac{1}{2R} m^2 d_R^2 (1 - \sin^2\theta_r \cos^2\phi_r) + \frac{1}{2R} n^2 d_T^2 \cos^2\theta_t - \\
&\quad \frac{1}{R} mnd_R d_T \cos\theta_r \cos\theta_t + md_R \sin\theta_r \cos\phi_r - nd_T \sin\theta_t
\end{aligned}$$

for appropriately defined angles $\theta_t$, $\theta_r$, and $\phi_r$.

In the special case that all of these angles are zero, the two linear arrays are parallel and are also perpendicular to the line connecting the endpoints of the arrays, then we have that $$r_{m,n} \approx R + \frac{1}{2R}(m^2 d_R^2 + n^2 d_T^2) - \frac{1}{R} mnd_R d_T$$

and the channel matrix can be expressed as $$H = \frac{\lambda}{4\pi R}\exp\left(-j\frac{2\pi R}{\lambda}\right)A\left(\frac{d_R^2}{\lambda R}\right)F\left(\frac{d_T d_R}{\lambda R}\right)B\left(\frac{d_T^2}{\lambda R}\right).$$

For example, the channel matrix can have the same form as above, A×F×B, where A and B can be diagonal matrices, and F can be an IDFT matrix that is possibly oversampled. Also, only three parameters may be required and the third parameter can be determined from any two of the three parameters. Also, as above, the receiver can solve for the three parameters from the measured channel matrix H.

For a slightly more general case, the two linear arrays lie in planes that are perpendicular to the line connecting the endpoints of the arrays. In this case, the angles $\theta_t$ and $\phi_r$ have values $\theta_t=0$ $\phi_r=\pm\pi/2$, and the distance between elements of the two arrays is given by $$r_{m,n} \approx R + \frac{1}{2R}(m^2 d_R^2 + n^2 d_T^2) - \frac{1}{R}mn d_R d_T \cos\theta_r.$$

In this case, the channel matrix can be expressed as $$H = \frac{\lambda}{4\pi R}\exp\left(-j\frac{2\pi R}{\lambda}\right)A\left(\frac{d_R^2}{\lambda R}\right)F\left(\frac{d_T d_R \cos\theta_r}{\lambda R}\right)B\left(\frac{d_T^2}{\lambda R}\right)$$

It can be noted that in this case, the channel matrix can be fully characterized, within a complex multiple constant, from the following three parameters $$\frac{d_R^2}{\lambda R}, \frac{d_T d_R \cos\theta_r}{\lambda R}, \text{ and } \frac{d_T^2}{\lambda R},$$

regardless of the size of the channel matrix (i.e., regardless of the number of antennas). Although only three parameters may be required as in the previous case, one of the parameters can be slightly changed. As a result, the three parameters can now be decoupled in that two parameters may not be used to compute the third. However, the transmitter may only need to know two of the three parameters, and this can be as in the previous case. Also, as in the previous case, the receiver can solve for the three parameters from the measured channel matrix H.

For the completely general case, the distance between the elements of the first and second arrays is given by $$r_{m,n} \approx R + \frac{1}{2R}m^2 d_R^2(1 - \sin^2\theta_r \cos^2\phi_r) + \frac{1}{2R}n^2 d_T^2 \cos^2\theta_t - \frac{1}{R}mn d_R d_T \cos\theta_r \cos\theta_t + m d_R \sin\theta_r \cos\phi_r - n d_T \sin\theta_t.$$

where $\phi_r$ can be an angle of azimuth of the receiver array of antennas. In this case, the channel matrix can be expressed as $$H = \frac{\lambda}{4\pi R}\exp\left(-j\frac{2\pi R}{\lambda}\right)C\left(\frac{d_R \sin\theta_r \cos\phi_r}{\lambda}\right)$$

-continued $$A\left(\frac{d_R^2(1 - \sin^2\theta_r \cos^2\phi_r)}{\lambda R}\right) \cdot F\left(\frac{d_T d_R \cos\theta_r \cos\theta_t}{\lambda R}\right)$$

$$B\left(\frac{d_T^2 \cos^2\theta_t}{\lambda R}\right)D\left(\frac{-d_T \sin\theta_t}{\lambda}\right).$$

For this case, the situation may be a bit more complicated. The channel matrix can now be of the form C×A×F×B×D. Here, C, A, B, and D can be all diagonal matrices. As above the matrix F can be an IDFT matrix which can be possibly oversampled. For this last case, there can be five parameters and each matrix can depend on one of these parameters. The transmitter can depend on three of the parameters, whereas in the previous cases the transmitter may only depend on two parameters. The receiver can solve for the five parameters from the measured channel matrix.

As before, the matrix F is a square IDFT matrix which may be under-sampled or over-sampled. The matrix C is a diagonal matrix for which all non-zero elements have unit magnitude and are given by $C_{i,i}(y)=\exp(-j\pi i y)$.

Similarly, D is defined as $D_{i,i}(y)=\exp(-j\pi i y)$

It can be observed that in the most general case, the channel matrix can be fully characterized, within a complex multiplicative constant, by the following five parameters $$\frac{d_R^2(1 - \sin^2\theta_r \cos^2\phi_r)}{\lambda R}, \frac{d_R \sin\theta_r \cos\phi_r}{\lambda}, \frac{d_T d_R \cos\theta_r \cos\theta_t}{\lambda R}, \frac{d_T^2 \cos^2\theta_t}{\lambda R},$$

and $$\frac{d_T \sin\theta_t}{\lambda}$$

regardless of the size of the channel matrix (i.e., regardless of the number of antennas). It can also be noted, that in the extreme far field, we have the following limiting behavior $$\frac{d_R^2(1 - \sin^2\theta_r \cos^2\phi_r)}{\lambda R} \xrightarrow[R\to\infty]{} 0, \frac{d_T^2 \cos^2\theta_t}{\lambda R} \xrightarrow[R\to\infty]{} 0$$

$$\frac{d_T d_R \cos\theta_r \cos\theta_t}{\lambda R} \xrightarrow[R\to\infty]{} 0,$$

so that in the extreme far field, only the following terms are non-zero, and these determine the extreme far-field line-of-sight channel $$\frac{d_R \sin\theta_r \cos\phi_r}{\lambda}, \frac{d_T \sin\theta_t}{\lambda}.$$

It can be noted that the extreme far-field line-of-sight channel has rank one and so is also referred to here as the rank one line-of-sight channel.

As before, let U and V denote the left and right singular vectors of F, respectively. In this case, the left and right singular vectors of the product $$C\left(\frac{d_R \sin\theta_r \cos\phi_r}{\lambda}\right)A\left(\frac{d_R^2(1 - \sin^2\theta_r \cos^2\phi_r)}{\lambda R}\right) \cdot F\left(\frac{d_T d_R \cos\theta_r \cos\theta_t}{\lambda R}\right)$$

-continued $$B\left(\frac{d_T^2\cos^2\theta_t}{\lambda R}\right)D\left(\frac{-d_T\sin\theta_t}{\lambda}\right)$$

are given by are given by the columns of $\tilde{U}$ and $\tilde{V}$, respectively, where $$\tilde{U} = C\left(\frac{d_R\sin\theta_r\cos\phi_r}{\lambda}\right)A\left(\frac{d_R^2(1-\sin^2\theta_r\cos^2\phi_r)}{\lambda R}\right)U, \text{ and}$$

$$\tilde{V} = B\left(\frac{-d_T^2\cos^2\theta_t}{\lambda R}\right)D\left(\frac{d_T\sin\theta_t}{\lambda}\right)V.$$

Also, the singular values of the product $$C\left(\frac{d_R\sin\theta_r\cos\phi_r}{\lambda}\right)A\left(\frac{d_R^2(1-\sin^2\theta_r\cos^2\phi_r)}{\lambda R}\right) \cdot F\left(\frac{d_T d_R\cos\theta_r\cos\phi_t}{\lambda R}\right)$$

$$B\left(\frac{d_T^2\cos^2\theta_t}{\lambda R}\right)D\left(\frac{-d_T\sin\theta_t}{\lambda}\right)$$

are equal to the singular values of $$F\left(\frac{d_T d_R\cos\theta_r\cos\theta_t}{\lambda R}\right)$$

and thus the singular values only depend on the single parameter $$\frac{d_T d_R\cos\theta_r\cos\theta_t}{\lambda R}.$$

As in the simpler case considered previously, it is possible to estimate the five parameters that completely determine the LOS channel (within a complex scalar) from measurements of the channel, though the problem is slightly more complicated. Let the K×L matrix $\hat{H}$ denote the channel measured using reference symbols, which is given by $$\hat{H} = H + N$$

and N is a K×L matrix of i.i.d. complex Gaussian random variables of variance $\sigma^2$. Let the K×L matrix $\angle\hat{H}$ denote phases of the elements of $\hat{H}$ measured in radians. Let the (K−1)×L matrix $\Delta_R(\angle\hat{H})$ denote the matrix with k-th row equal to the result of subtracting the k-th row of $\angle\hat{H}$ from the k+1-th row of $\angle\hat{H}$. The matrix $\Delta_R(\angle\hat{H})$ can also be computed by dividing the k+1-th row of $\hat{H}$ by the k-th row of $\hat{H}$ and taking the phase of each element of the resulting (K−1)×L matrix. The matrix $\Delta_R(\angle\hat{H})$ can be written in the form $$\Delta_R(\angle\hat{H}) = -\pi \cdot \begin{bmatrix} a+b & a+b-2c & \ldots & a+b-2(L-1)c \\ 3a+b & 3a+b-2c & \ldots & \ldots \\ \ldots & \ldots & \ldots & \ldots \\ (2K-1)a+b & \ldots & \ldots & (2K-1)a+b-2(L-1)c \end{bmatrix} + N_R$$

where the K−1×L matrix $N_R$ denotes the noise in the calculation of the phase differences between rows, and a, b and c denote the parameters $$a = \frac{d_R^2(1-\sin^2\theta_r\cos^2\phi_r)}{\lambda R}, b = \frac{d_R\sin\theta_r\cos\phi_r}{\lambda}, \text{ and}$$

$$c = \frac{d_T d_R\cos\theta_r\cos\theta_t}{\lambda R}$$

Let $\Delta_R^S(\angle\hat{H})$ denote the stacked columns of $\Delta_R(\angle\hat{H})$, and let $N_R^S$ denote the stacked columns of $N_\angle$. We then have that $$\Delta_R^S(\angle\hat{H}) = -\pi\begin{bmatrix} 1 & 1 & 0 \\ 3 & 1 & 0 \\ \vdots & \vdots & \vdots \\ 2K-1 & 1 & 0 \\ 1 & 1 & -2 \\ 3 & 1 & -2 \\ \vdots & \vdots & \vdots \\ 2K-1 & 1 & -2 \\ \vdots & \vdots & \vdots \\ \vdots & \vdots & \vdots \\ 1 & 1 & -2(L-1) \\ 3 & 1 & -2(L-1) \\ \vdots & \vdots & \vdots \\ 2K-1 & 1 & -2(L-1) \end{bmatrix}\begin{bmatrix} a \\ b \\ c \end{bmatrix} + N_R^S = W_R\begin{bmatrix} a \\ b \\ c \end{bmatrix} + N_R^S$$

where the (K−1)L×3 matrix $W_R$ is implicitly defined from the above equation.

This system of equation is highly over-determined since we have (K−1)L equations with only three unknowns. With the formulation, the least-squared error estimate is given by $$\begin{bmatrix} \frac{d_R^2(1-\sin^2\theta_r\cos^2\phi_r)}{\lambda R} \\ \frac{d_R\sin\theta_r\cos\phi_r}{\lambda} \\ \frac{d_T d_R\cos\theta_r\cos\theta_t}{\lambda R} \end{bmatrix}_{LSE} = (W_R^H W_R)^{-1} W_R^H \Delta_R^S(\angle\hat{H})$$

Similarly, to solve for the last two parameters, let the matrix K×(L−1) matrix $\Delta_C(\angle\hat{H})$ denote the matrix with k-th row equal to the result of subtracting the l-th column of $\angle\hat{H}$ from the l+1-th column of $\angle\hat{H}$. The matrix $\Delta_C(\angle\hat{H})$ can also be computed by dividing the l+1-th column of $\hat{H}$ by the l-th column of $\hat{H}$ and taking the phase of each element of the resulting K×(L−1) matrix. The matrix $\Delta_C(\angle\hat{H})$ is given by $$\Delta_C(\angle\hat{H}) = -\pi\begin{bmatrix} e-d-2c & 3e-d-2c & \ldots & (2L-1)e-d-2c \\ e-d-4c & 3e-d-4c & \ldots & \ldots \\ \ldots & \ldots & \ldots & \ldots \\ e-d-2Kc & \ldots & \ldots & (2L-1)e-d-2Kc \end{bmatrix} + N_C$$

where the K−1×L matrix $N_C$ denotes the noise in the calculation of the phase differences between columns, and c, d and e denote the parameters $$c = \frac{d_T d_R \cos\theta_r \cos\theta_t}{\lambda R}, \, d = \frac{d_T \sin\theta_t}{\lambda}, \text{ and } e = \frac{d_T^2 \cos^2\theta_t}{\lambda R}.$$

Let $\Delta_C^S(\angle\hat{H})$ denote the stacked columns of $\Delta_C(\angle\hat{H})$, and let $N_C^S$ denote the stacked columns of $N_C$. We then have that $$\Delta_C^S(\angle\hat{H}) = -\pi \begin{bmatrix} 1 & -1 & -2 \\ 1 & -1 & -4 \\ \vdots & \vdots & \vdots \\ 1 & -1 & -2K \\ 3 & -1 & -2 \\ 3 & -1 & -4 \\ \vdots & \vdots & \vdots \\ 3 & -1 & -2K \\ \vdots & \vdots & \vdots \\ \vdots & \vdots & \vdots \\ \vdots & \vdots & \vdots \\ 2L-1 & -1 & -2 \\ 2L-1 & -1 & -4 \\ \vdots & \vdots & \vdots \\ 2L-1 & -1 & -2K \end{bmatrix} \begin{bmatrix} c \\ d \\ e \end{bmatrix} + N_C^S = W_C \begin{bmatrix} c \\ d \\ e \end{bmatrix} + N_C^S.$$

where the K(L−1)×3 matrix $W_C$ is implicitly defined from the above equation. This system of equation is highly over-determined since we have (K−1)L equations with only three unknowns. With the formulation, the least-squared estimate is given by $$\begin{bmatrix} \frac{d_T^2 \cos^2\theta_t}{\lambda R} \\ \frac{d_T \sin\theta_t}{\lambda} \\ \frac{d_T d_R \cos\theta_r \cos\theta_t}{\lambda R} \end{bmatrix}_{LSE} = (W_C^H W_C)^{-1} W_C^H \Delta_C^S(\angle\hat{H}).$$

Figure 4:
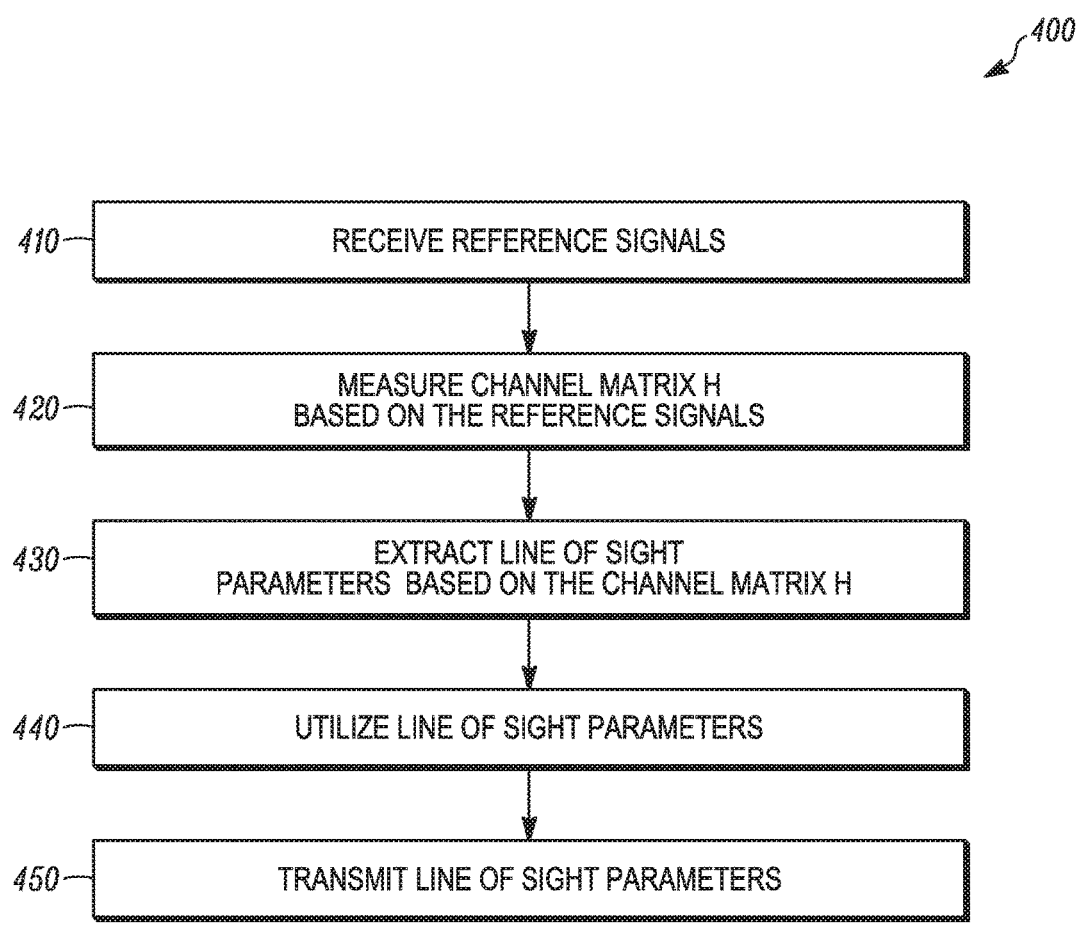
FIG. 4 is an example flowchart illustrating the operation of a device according to a possible embodiment.

FIG. 4 is an example flowchart 400 illustrating the operation of a device, such as the receiver 120, according to a possible embodiment. For example, the method can be performed at a UE, an eNB, and/or any other device that can receive reference signals and measure a channel matrix. At 410, reference signals from a transmitting device can be received at a receiving device. At 420, a channel matrix H can be measured based on the reference signals.

At 430, at least two of a first line of sight channel parameter, a second line of sight channel parameter, and a third line of sight channel parameter can be extracted based on the channel matrix H. The first line of sight channel parameter can be based on transmitting device antenna element spacing. The second line of sight channel parameter can be based on a product of the transmitting device antenna element spacing and a receiving device antenna element spacing. The third line of sight channel parameter can be based on the receiving device antenna element spacing. The parameters can be extracted by forming a least-squared error estimate of the at least two line of sight channel parameters based on the channel matrix H. For example, with additive noise, a least-squares and/or iterative formulation can be used to solve for these parameters.

At least one of the at least two line of sight channel parameters can be based on a link range (R) between antennas at a transmitting device and antennas at a receiving device, a distance ($d_T$) between neighboring transmit antennas, a distance ($d_R$) between neighboring receive antennas, and a wavelength ($\lambda_1$) of a carrier signal of the reference signals. For example, one or both of the at least two line of sight channel parameters can be based on the link range, the distances between antennas, and the wavelength when antenna arrays at the transmitting device and the receiving device are parallel and planes perpendicular to a line connecting the endpoints of the two arrays.

The first line of sight parameter can be a two-dimension parameter based on the transmitting device antenna element spacing in a horizontal direction and the transmitting device antenna element spacing in a vertical dimension. The third line of sight parameter can be a two-dimension parameter based on the receiving device antenna element spacing in the horizontal and receiving device antenna element spacing in the vertical dimension. For example, the transmitting antennas can be separated in two dimensions and receiving antennas can be separated in two dimensions.

The channel matrix H can be equal to a complex number multiplied by three matrices A, F, and B, where A and B can be diagonal matrices and where F can be an Inverse Discrete Fourier Transform (IDFT) matrix or an oversampled IDFT matrix. Elements of the matrix A can be based on the first line of sight channel parameter. Elements of the matrix F can be based on the second line of sight channel parameter. Elements of the matrix B can be based on the third line of sight channel parameter.

The channel matrix H can also be equal to a complex number multiplied by five matrices C, A, F, B and D, where C, A, B and D can be diagonal matrices, and F can be an IDFT matrix or an oversampled IDFT matrix. In other words, the channel matrix H can be equal to a complex number multiplied by three matrices A', F, and B', where A' can be A×C, B' can be B×D, and all the multiplicand matrices can be diagonal matrices. The matrices C and D each can have a parameter associated with them that is dependent on the geometry. The diagonal elements of A all can have equal amplitude (typically one). Similarly, the diagonal elements of each of B, C, and D all can have equal amplitude (typically one).

The channel matrix H can also be equal to a Kronecker product of a horizontal antenna channel matrix $H_h$ and a vertical antenna channel matrix $H_v$. The horizontal antenna channel matrix $H_h$ can be equal to a complex number multiplied by three matrices $A_h$, $F_h$, and $B_h$, where $A_h$ and $B_h$ can be diagonal matrices and $F_h$ can be an IDFT matrix or an oversampled IDFT matrix. The diagonal elements of $A_h$ all can have equal amplitude (typically one) and the diagonal elements of $B_h$ all can have equal amplitude. The vertical antenna channel matrix $H_v$ can be equal to a complex number multiplied by three matrices $A_v$, $F_v$, and $B_v$, where $A_v$ and $B_v$ can be diagonal matrices and $F_v$ can be an IDFT matrix or an oversampled IDFT matrix.

At 440, the line of site parameters can be utilized. For example, according to a possible implementation, precoders can be determined based on the at least two line of sight channel parameters and the precoders can be applied to an antenna array. The receiving device can apply the precoders to the channel to determine a Channel Quality Indicator (CQI). The receiving device can also apply the precoders to transmitted signals. The transmitting device can also determine the precoders based on the at least two line of sight channel parameters.

According to another possible related implementation, a rotation of an antenna array at the receiving device can be adjusted based on at least one of the line of sight channel parameters. For example, the rotation of the antenna array can be adjusted to improve the spacing of the elements relative to the orientation of the transmitter and receiver. The rotation of the antenna array can also be adjusted at the transmitting device. Alternatively, the transmitter and/or receiver can change the subset of antenna elements (from a presumed larger array) that are used to transmit and/or receive.

According to another possible related implementation, at least one of the line of sight channel parameters can be evaluated over a set of allowed wavelengths. A wavelength that yields the channel matrix H with the largest capacity can be selected from the set of allowed wavelengths.

According to another possible related implementation, an inverted channel mode of transmission can be selected based on a line of sight channel parameter being approximately equal to a reciprocal of a number of antennas in an array of antennas of the transmitting device. Full rank transmission can be when the transmission rank or number of layers equals the number of transmit antennas, where the transmission rank can be the number of transmission streams transmitted simultaneously on a same frequency resource. For example, full rank can be a number of layers that are the minimum of the number M of transmit antennas and the number N of receive antennas, such as the minimum of M and N. As a further example, a simplified receiver can be enabled by inverting the channel matrix H prior to transmission by first multiplying the data vector by a diagonal matrix, taking the DFT of the pre-multiplied data vector, and finally by multiplying the output of the DFT by another diagonal matrix. In this case, a simplified receiver can be a MIMO receiver in which the data estimate can be formed by simply multiplying the vector output of the receive antenna array by a complex scalar. Conversely, in a typical MIMO receiver, the data estimate can be formed by multiplying the vector output of the receive antenna array by a complex-valued matrix. For a DFT taken of data for transmission at the transmitter, if it is assumed that both the transmit and receive antenna arrays have M antennas, then a vector of M data symbols can be presented to the transmitter. The transmitter can first multiply the data vector by a diagonal matrix, take the DFT of the pre-multiplied data vector, multiply the output of the DFT by another diagonal matrix. The output can be another vector of M symbols. Each of these M symbols can then be mapped, in order, to the M elements of the antenna array.

According to another possible related implementation, the at least two line of sight channel parameters can be scaled by a ratio of a wavelength $(\lambda_1)$ of a carrier signal of the reference signals to a transmit wavelength. According to another possible related implementation, a subset of transmitting device antennas that yield improved line of sight capacity over a set of transmitting device antennas can be determined based on at least one of the at least two line of sight channel parameters. For example, a receiver UE can determine the subset of L transmitter eNB or Access Point (AP) antennas that yields the best LOS capacity and signal this set back to the eNB or AP. This subset of antennas may be regularly spaced.

At 450, the at least two line of sight channel parameters can be transmitted to the transmitting device. Transmitting can include transmitting the scaled at least two line of sight channel parameters to the transmitting device. Also, the subset of transmitting device antennas can be signaled to the transmitting device. Additionally, a scaling factor for the channel matrix H can be signaled to the transmitting device. For example, the scaling factor can be based on $$\frac{\lambda}{4\pi R}\exp\left(-j\frac{2\pi R}{\lambda}\right)$$

and the signaled scaling factor can be the amplitude:

$$\frac{\lambda}{4\pi R}.$$

The scaling factor can be used for the spacing that optimizes the capacity of a communication link and can be used to determine a coding rate that can be used at the transmitting device.

Figure 5:
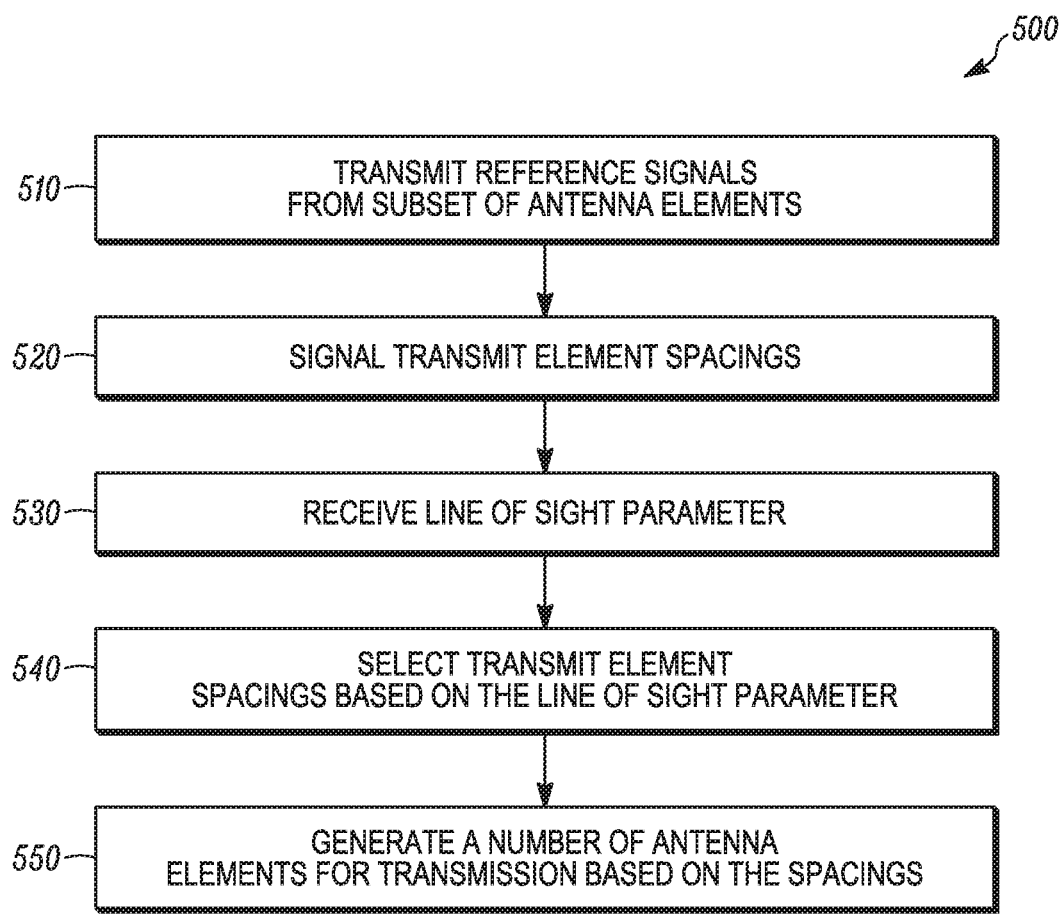
FIG. 5 is an example flowchart illustrating the operation of a device according to a possible embodiment.

FIG. 5 is an example flowchart 500 illustrating the operation of a device, such as the transmitter 110, according to a possible embodiment. At 510, reference symbols can be transmitted from a regularly spaced subset of a set of transmitting device antenna elements of a transmitter with locations in in one or more spatial dimensions. The regularly spaced subset of the transmitting device antenna elements can be generated by a combination of a subset from the antenna elements of a horizontal dimension antenna array and a subset from the antenna elements of a vertical dimension antenna array. At 520, transmit antenna element spacings in each dimension can be signaled, where the transmit antenna element spacings can be used by the transmitter for data transmission. The transmit antenna element spacings can be signaled in the form of ratios to the spacing of transmitting device antenna elements that were used for the transmitted references symbols.

At 530, a line of sight channel parameter can be received. The line of sight channel parameter can be $$\frac{d_T d_R}{\lambda_1 R}$$

where R can be link range between antennas at a transmitting device and antennas at a receiving device, $d_T$ can be a distance between neighboring transmit antennas, $d_R$ can be a distance between neighboring receive antennas, and $\lambda_1$ can be a wavelength of a carrier signal.

The line of sight channel parameter can also be $$\frac{d_T d_R \cos\theta_r}{\lambda R}$$

where $\theta_r$ can be an angle of declination angle of the receiver array of antennas. For example, the line of sight parameter can be multiplied by an additional factor that is geometry dependent.

The line of sight channel parameter can also be $$\frac{d_T d_R \cos\theta_r \cos\theta_t}{\lambda R}$$

where $\theta_t$ can be an angle of declination angle of an array of the transmitting device antenna elements.

An additional line of sight channel parameter that includes a scaling factor for the line of sight channel can also be received. The scaling factor can scale a channel matrix H in order to determine the coding rate that can be used at the transmitter.

At 540, transmit antenna element spacings in each spatial dimension can be selected that maximize a communication link capacity based on the line of sight channel parameter. The assumption here can be that the total number of antenna elements used for transmission is same so that total power is also same.

At 550, a number of antenna elements for transmission in each dimension can be generated based on the selected transmit antenna element spacings. A product of the number of antenna elements in each dimension is less than a predefined value. This can ensure that the total power is below a threshold. Transmissions can then be made using the number of antenna elements.

Figure 6:
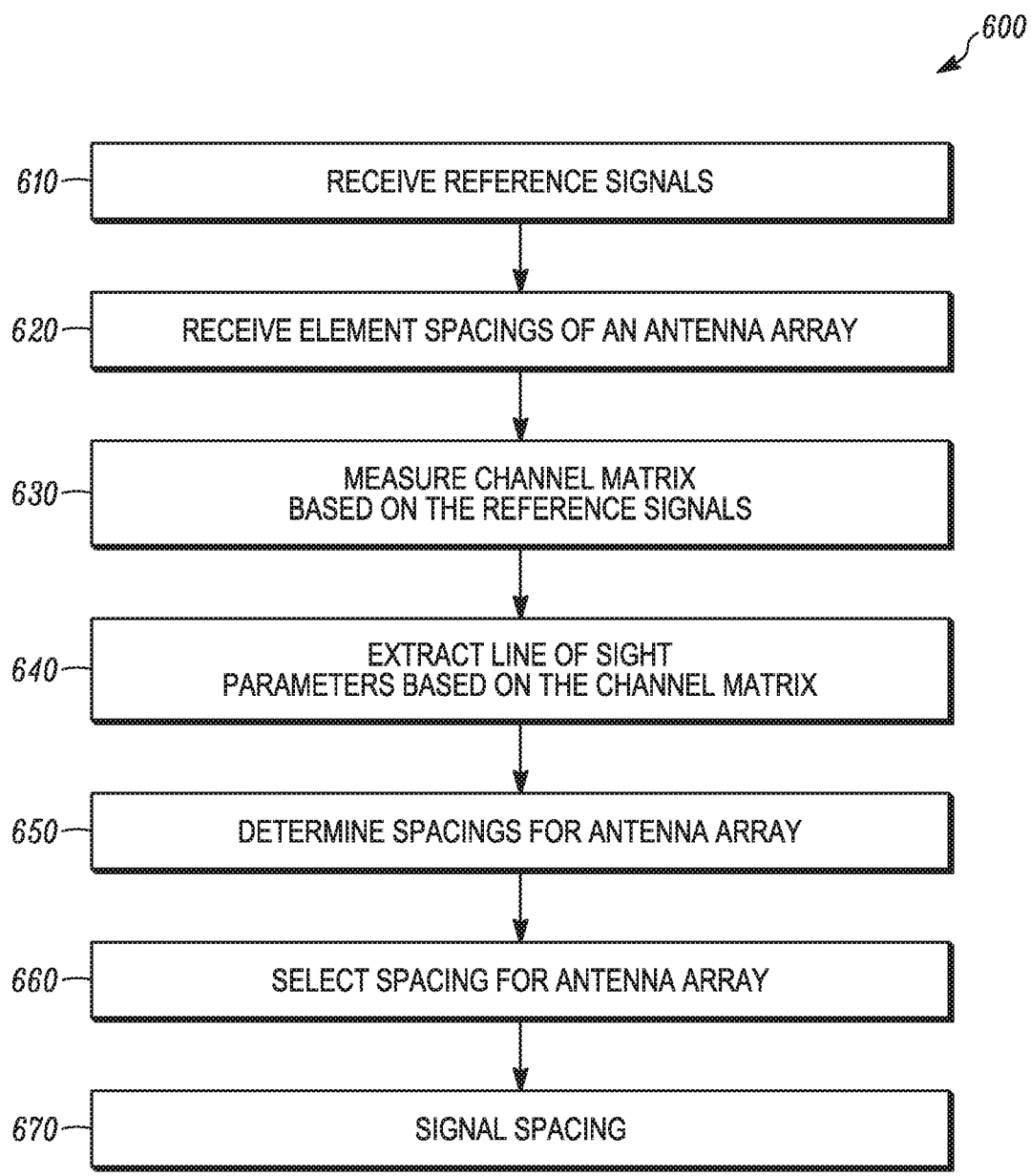
FIG. 6 is an example flowchart illustrating the operation of a device according to a possible embodiment.

FIG. 6 is an example flowchart 600 illustrating the operation of a device, such as the receiver 120, according to a possible embodiment. At 610, reference signals can be received from a transmitting device. At 620, element spacings can be received. The element spacings can be for each spatial dimension of an array of antennas at the transmitting device. The element spacings can be allowed element spacings. At 630, a channel matrix $H(\lambda_1)$ based on the reference signals can be measured. At 640, a line of sight channel parameter for each element spacing for each spatial dimension of the array of antennas at the transmitting device can be extracted based on the channel matrix $H(\lambda_1)$.

At 650, the spacing for antennas in the array of antennas in each spatial dimension that optimizes a capacity of a communication link can be determined based on the line of sight channel parameter. At 660, a spacing for antennas in the array of antennas in each spatial dimension that optimizes a capacity of a communication link can be selected. At 670, the spacing that optimizes the capacity of the communication link can be signaled, such as to the transmitting device. A scaling factor for the matrix $H(\lambda_1)$ for the spacing that optimizes the capacity of a communication link can also be signaled. For example, the scaling factor can be based on $$\frac{\lambda}{4\pi R}\exp\left(-j\frac{2\pi R}{\lambda}\right)$$

and the signaled scaling factor can be the amplitude:

$$\frac{\lambda}{4\pi R}.$$

Figure 7:
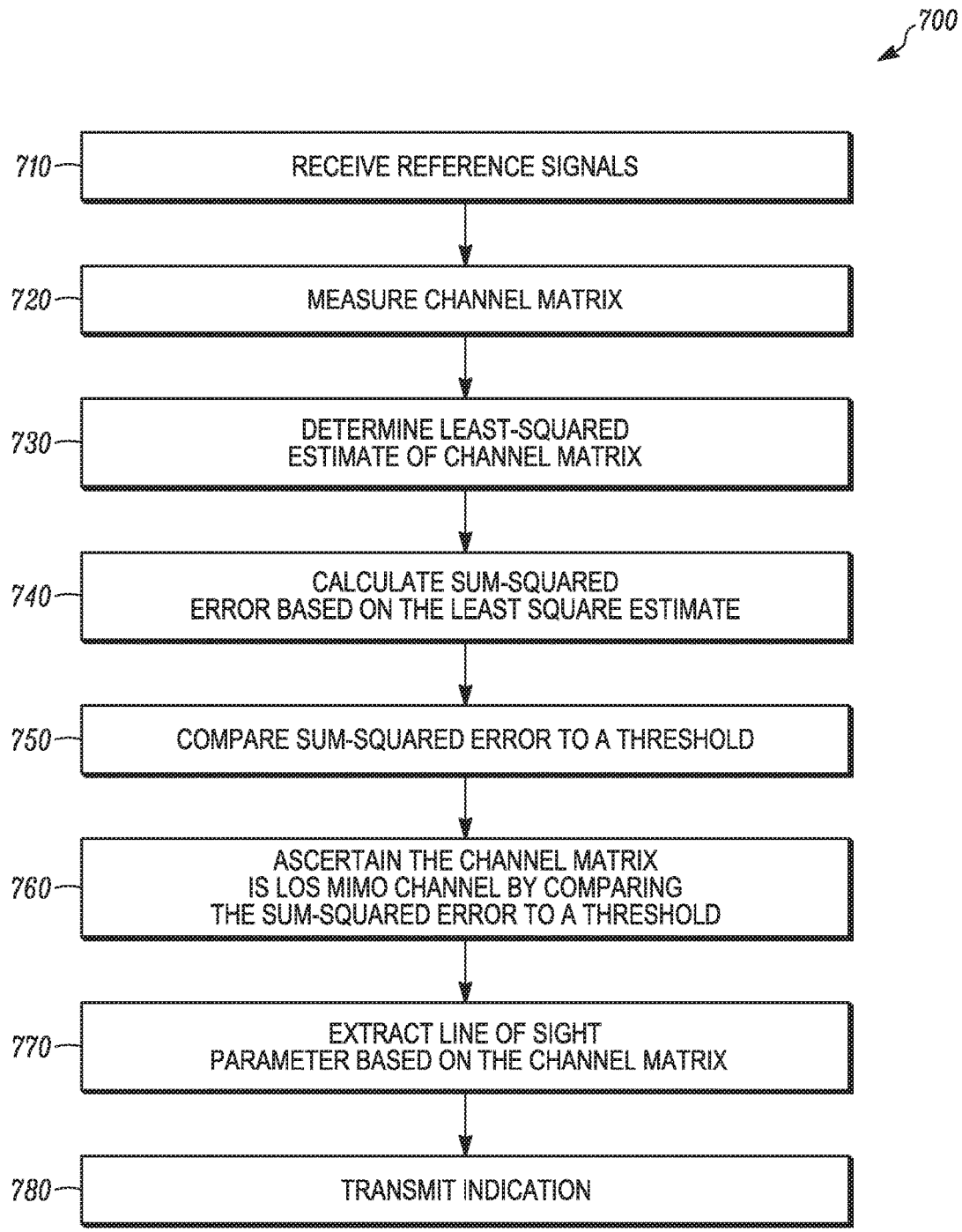
FIG. 7 is an example flowchart illustrating the operation of a device according to a possible embodiment.

FIG. 7 is an example flowchart 700 illustrating the operation of a device, such as the receiver 120, according to a possible embodiment. At 710, reference signals can be received. At 720, a channel matrix $H(\lambda_1)$ can be measured based on the reference signals. At 730, a least-squared error estimate of the measured channel matrix $H(\lambda_1)$ can be determined. At 740, a sum-squared error can be calculated based on the least-squared error estimate. At 750, the sum-squared error based on the least-squared error estimate can be compared to a threshold.

At 760, the measured channel matrix $H(\lambda_1)$ can be ascertained to be classified as a LOS-MIMO channel based on comparing the sum-squared error based on the least-squared error estimate to the threshold. The measured channel matrix $H(\lambda_1)$ can also be ascertained to be classified as a rank one LOS channel based on comparing a sum-squared error based on the least-squared error estimate to a threshold. The transmission rank can be the number of transmission streams transmitted simultaneously on a same frequency resource. For example, the measured channel matrix $H(\lambda_1)$ can be ascertained to be classified as a rank one LOS channel based on comparing a sum-squared error based on the least-squared error estimate to a threshold. Then a phase difference of reference signals received at a single receive antenna and transmitted from two different antennas can be measured.

At 770, a line of sight channel parameter can be extracting based on the channel matrix $H(\lambda_1)$. The line of sight channel parameter can be extracted by calculating a phase angle based on an estimate of the channel matrix. The line of sight channel parameter can also be extracted by calculating the phase angle of a ratio of two adjoining elements of the estimate of the channel matrix. The line of sight channel parameter can also be extracted by an optimization of an error value of the calculated phase angle. The optimization of the error value of the calculated phase angle can be performed by a least-squared error method.

The line of sight channel parameter can be $$\frac{d_T d_R}{\lambda_1 R}$$

where R can be link range between antennas at a transmitting device and antennas at a receiving device, $d_T$ can be a distance between neighboring transmit antennas, $d_R$ can be a distance between neighboring receive antennas, and $\lambda_1$ can be a wavelength of a carrier signal.

The line of sight channel parameter can also be $$\frac{d_T d_R \cos\theta_r}{\lambda R}$$

where $\theta_r$ can be an angle of declination angle of the receiver array of antennas. For example, the line of sight parameter can be multiplied by an additional factor that is geometry dependent.

The line of sight channel parameter can additionally be $$\frac{d_T d_R \cos\theta_r \cos\theta_t}{\lambda R}$$

where $\theta_t$ can be an angle of declination angle of an array of the transmitting device antenna elements.

At 780, an indication that the measured channel matrix $H(\lambda_1)$ is classified as a LOS-MIMO channel can be transmitted based on comparing a sum-squared error based on the least-squared error estimate to a threshold. The line of sight parameter can also be transmitted. An indication of the measured phase difference of the reference signals can additionally be signaled to the transmitting device. A scaling factor can also be signaled for the channel matrix $H(\lambda)$. For example, the scaling factor can be based on $$\frac{\lambda}{4\pi R}\exp\left(-j\frac{2\pi R}{\lambda}\right)$$

and the signaled scaling factor can be the amplitude $$\frac{\lambda}{4\pi R}.$$

The scaling factor can be used to determine a coding rate that can be used at the transmitting device.

Figure 8:
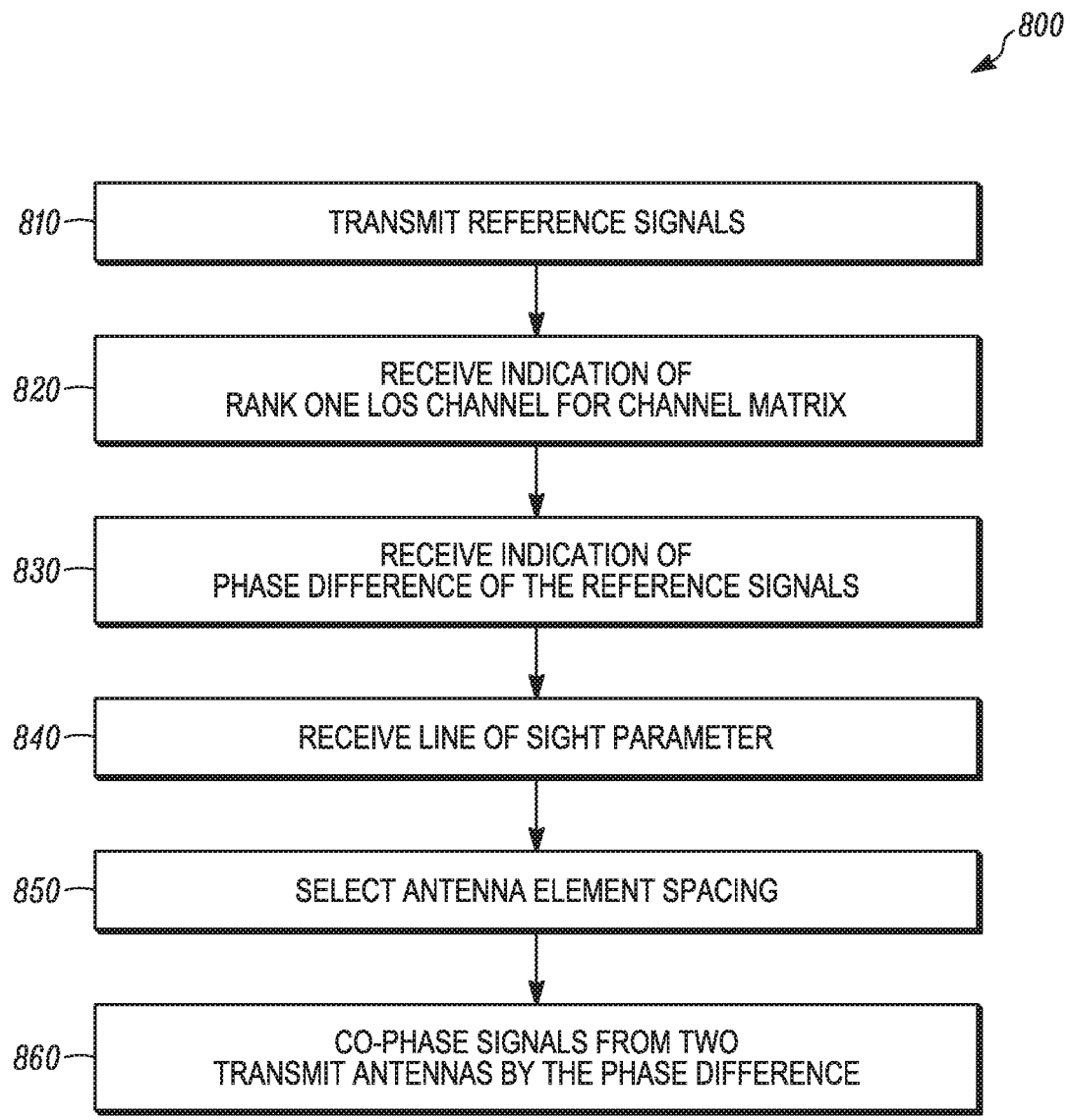
FIG. 8 is an example flowchart illustrating the operation of a device according to a possible embodiment.

FIG. 8 is an example flowchart 800 illustrating the operation of a device, such as the transmitter 110, according to a possible embodiment. At 810, reference signals can be transmitted from two different transmitter antennas. At 820, an indication can be received that indicates a channel matrix $H(\lambda_1)$ is classified as a rank one LOS channel At 830, an indication of a phase difference of the reference signals transmitted from the two different transmitter antennas to a single receive antenna can be received.

At 840, a line of sight channel parameter can be received. The line of sight channel parameter can be $$\frac{d_T d_R}{\lambda_1 R}$$

where R can be a link range between antennas at a transmitting device and antennas at a receiving device, $d_T$ can be a distance between neighboring transmit antennas, $d_R$ can be a distance between neighboring receive antennas, and $\lambda_1$ can be a wavelength of a carrier signal.

The line of sight channel parameter can also be $$\frac{d_T d_R \cos\theta_r}{\lambda R}$$

where $\theta_r$ can be an angle of declination angle of the receiver array of antennas. For example, the line of sight parameter can be multiplied by an additional factor that is geometry dependent.

The line of sight channel parameter can additionally be $$\frac{d_T d_R \cos\theta_r \cos\theta_t}{\lambda R}$$

where $\theta_t$ can be an angle of declination angle of an array of the transmitting device antenna elements.

At 850, antenna element spacing in each spatial dimension can be selected that maximizes a communication link capacity based on the at least one line of sight channel parameter. At 860, signals from two transmit antennas can be co-phased by the received indicated phase difference so they arrive in-phase at a receiving device.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 9:
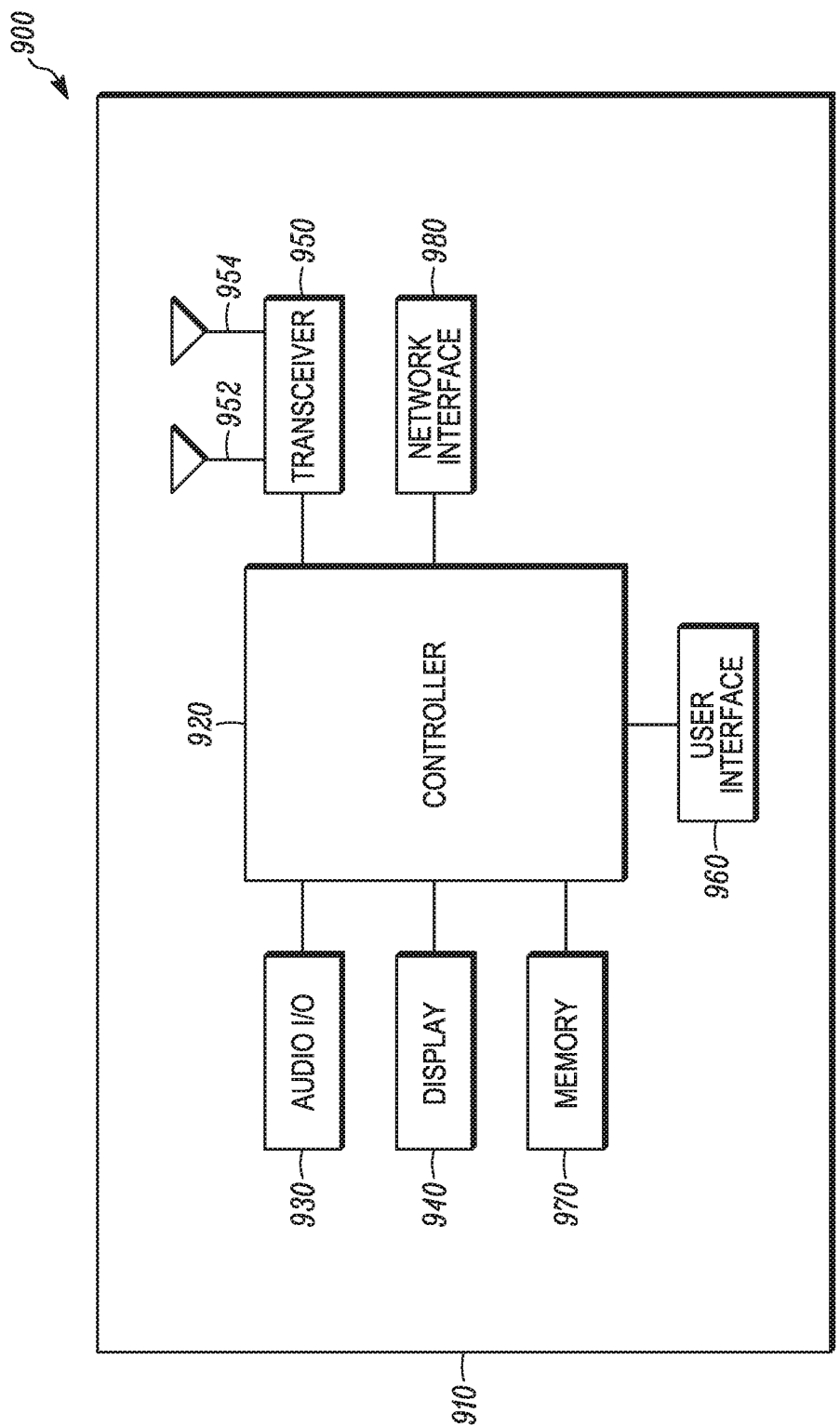
FIG. 9 is an example block diagram of an apparatus according to a possible embodiment.

FIG. 9 is an example block diagram of an apparatus 900, such as the transmitter 110 or the receiver 120, according to a possible embodiment. The apparatus 900 can include a housing 910, a controller 920 within the housing 910, audio input and output circuitry 930 coupled to the controller 920, a display 940 coupled to the controller 920, a transceiver 950 coupled to the controller 920, a user interface 960 coupled to the controller 920, a memory 970 coupled to the controller 920, and a network interface 980 coupled to the controller 920. The apparatus 900 can also include a plurality of antennas, such as an antenna array, including at least antennas 952 and antenna 954 coupled to the transceiver 950. The transceiver 950 can be one or a plurality of transceivers. The apparatus 900 can perform the methods described in all the embodiments.

The display 940 can be a viewfinder, a liquid crystal display (LCD), a light emitting diode (LED) display, a plasma display, a projection display, a touch screen, or any other device that displays information. The transceiver 950 can include a transmitter and/or a receiver. The audio input and output circuitry 930 can include a microphone, a speaker, a transducer, or any other audio input and output circuitry. The user interface 960 can include a keypad, a keyboard, buttons, a touch pad, a joystick, a touch screen display, another additional display, or any other device useful for providing an interface between a user and an electronic device. The network interface 980 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 970 can include a random access memory, a read only memory, an optical memory, a flash memory, a removable memory, a hard drive, a cache, or any other memory that can be coupled to an apparatus.

The apparatus 900 or the controller 920 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 970 or elsewhere on the apparatus 900. The apparatus 900 or the controller 920 may also use hardware to implement disclosed operations. For example, the controller 920 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 920 may be any controller or processor device or devices capable of operating an apparatus and implementing the disclosed embodiments.

According to a possible embodiment, the transceiver 950 can receive reference signals as a receiving device from a transmitting device. The controller 920 can measure a channel matrix $H(\lambda_1)$ based on the reference signals. The channel matrix $H(\lambda_1)$ can be equal to a complex number multiplied by three matrices A, F, and B, where A and B can be diagonal matrices and F can be an Inverse Discrete Fourier Transform (IDFT) matrix or an oversampled IDFT matrix.

The controller 920 can extract, based on the channel matrix $H(\lambda_1)$, at least two of a first line of sight channel parameter, a second line of sight channel parameter, and a third line of sight channel parameter, where the first line of sight channel parameter can be based on transmitting device antenna element spacing, where the second line of sight channel parameter can be based on a product of the transmitting device antenna element spacing and antenna element spacing of the antenna array 952 and 954, and where the third line of sight channel parameter can be based on the antenna element spacing of the antenna array 952 and 954. The controller 920 can perform the extraction by forming a least-squared error estimate of the at least two line of sight channel parameters based on the channel matrix $H(\lambda_1)$.

According to a possible implementation, the controller 920 can determine precoders based on the at least two line of sight channel parameters and apply the precoders to the antenna array 952 and 954. According to another related possible implementation, the controller 920 can adjust a rotation of the antenna array 952 and 954 based on at least one of the line of sight channel parameters. According to another related possible implementation, the controller 920 can determine a subset of transmitting device antennas that yield improved line of sight capacity over a set of transmitting device antennas based on at least one of the at least two line of sight channel parameters, and can signal the subset of transmitting device antennas to the transmitting device. According to another related possible implementation, the controller 920 can evaluate at least one of the line of sight channel parameters over a set of allowed wavelengths and can select a wavelength from the set of allowed wavelengths that yields the channel matrix $H(\lambda_1)$ with the largest capacity. According to another related possible implementation, the controller 920 can select an inverted channel mode of transmission based on a line of sight channel parameter being approximately equal to a reciprocal of a number of antennas in an array of antennas of the transmitting device. The transceiver 950 can transmit the at least two line of sight channel parameters to the transmitting device.

According to another possible embodiment, the transceiver 950 can transmit reference symbols from a regularly spaced subset of a set of antenna elements with locations in in one or more spatial dimensions. The regularly spaced subset of the antenna elements can be generated by a combination of a subset from the antenna elements of a horizontal dimension antenna array and a subset from the antenna elements of a vertical dimension antenna array. The transceiver 950 can signal transmit antenna element spacings in each dimension that can be used by the transceiver 950 for data transmission. The transmit antenna element spacings can be signaled in the form of ratios to the spacing of antenna elements that were used for the transmitted references symbols.

The transceiver 950 can receive a line of sight channel parameter. The controller 920 can select the transmit antenna element spacings in each spatial dimension that maximize a communication link capacity based on the line of sight channel parameter. The transceiver 950 can also receive an additional line of sight channel parameter that includes a scaling factor for the line of sight channel The controller 920 can determine a number of antenna elements for transmission in each dimension based on the transmit antenna element spacings. A product of the number of antenna elements in each dimension can be less than a predefined value.

According to another possible embodiment, the transceiver 950 can receive reference signals from a transmitting device. The transceiver 950 can receive element spacings for each spatial dimension of an array of antennas at the transmitting device. The controller 920 can measure a channel matrix $H(\lambda_1)$ based on the reference signals. The controller 920 can extract, based on the channel matrix $H(\lambda_1)$, a line of sight channel parameter for each element spacing for each spatial dimension of the array of antennas at the transmitting device. The controller 920 can select a spacing for antennas in the array of antennas at the transmitting device in each spatial dimension that optimizes a capacity of a communication link. The transceiver 950 can signal the spacing that optimizes the capacity of the communication link.

According to another possible embodiment, a transceiver 950 can receive reference signals. The controller 920 can measure a channel matrix $H(\lambda_1)$ based on the reference signals. The controller 920 can determine a least-squared error estimate of the measured channel matrix $H(\lambda_1)$. The controller 920 can calculate a sum-squared error based on the least-squared error estimate. The controller 920 can compare the sum-squared error based on the least-squared error estimate to a threshold. The controller 920 can ascertain the measured channel matrix $H(\lambda_1)$ is classified as a LOS-MIMO channel based on comparing the sum-squared error based on the least-squared errpr estimate to the threshold.

The transceiver 950 can transmit an indication that the measured channel matrix $H(\lambda_1)$ is classified as a LOS-MIMO channel based on comparing a sum-squared error based on the least-squared error estimate to a threshold. The controller 920 can extract a line of sight channel parameter based on the channel matrix $H(\lambda_1)$ and the transceiver 950 can transmit the line of sight channel parameter.

The controller 920 can also ascertain the measured channel matrix $H(\lambda_1)$ is classified as a rank one LOS channel based on comparing a sum-squared error based on the least-squared error estimate to a threshold. The controller 920 can additionally measure a phase difference of reference signals received at a single receive antenna and transmitted from two different antennas. The transceiver can signal an indication of the phase difference to the transmitting device.

According to another possible embodiment, the transceiver 950 can transmit reference signals from two of a plurality of antennas. The transceiver 950 can receive an indication indicating a channel matrix $H(\lambda_1)$ is classified as a rank one LOS channel The transceiver 950 can receive an indication of a phase difference of reference signals transmitted from two different antennas of the plurality of antennas to a single receive antenna. The transceiver 950 can receive a line of sight channel parameter. The controller 920 can select antenna element spacing in each spatial dimension that maximizes a communication link capacity based on the at least one line of sight channel parameter. The controller 920 can co-phase signals from two antennas by the received indicated phase difference so they arrive in-phase at a receiving device.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" or "at least one selected from the group of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   transmitting, by a transmitter, reference symbols from a regularly spaced subset of a set of transmitting device antenna elements of the transmitter with elements spanning one or more spatial dimensions; and
   signaling transmit antenna element spacings in each dimension that can be used by the transmitter for data transmission, where the transmit antenna element spacings are signaled in the form of ratios to the spacing of transmitting device antenna elements that were used for the transmitted references symbols.

2. The method according to claim 1, wherein the regularly spaced subset of the transmitting device antenna elements is generated by a combination of a subset from the antenna elements of a horizontal dimension antenna array and a subset from the antenna elements of a vertical dimension antenna array.

3. The method according to claim 1, further comprising:
   receiving a line of sight channel parameter; and
   selecting transmit antenna element spacings in each spatial dimension that maximize a communication link capacity based on the line of sight channel parameter.

4. The method according to claim 3, further comprising generating a number of antenna elements for transmission in each dimension based on the selected transmit antenna element spacings.

5. The method according to claim 4, wherein a product of the number of antenna elements in each dimension is less than a predefined value.

6. The method according to claim 3, further comprising receiving an additional line of sight channel parameter that includes a scaling factor for the line of sight channel.

7. The method according to claim 3, wherein the line of sight channel parameter comprises:

$$\frac{d_T d_R}{\lambda_1 R}$$

where
   R is link range between antennas at a transmitting device and antennas at a receiving device,
   $d_T$ is a distance between neighboring transmit antennas,
   $d_R$ is a distance between neighboring receive antennas, and
   $\lambda_1$ is a wavelength of a carrier signal.

8. The method according to claim 7, wherein the line of sight channel parameter comprises:

$$\frac{d_T d_R \cos\theta_r}{\lambda R}$$

where $\theta_r$ comprises an angle of declination angle of the receiver array of antennas.

9. The method according to claim 8, wherein the line of sight channel parameter comprises:

$$\frac{d_T d_R \cos\theta_r \cos\theta_t}{\lambda R}$$

where $\theta_t$ comprises an angle of declination angle of an array of the transmitting device antenna elements.

10. A method comprising:
    receiving reference signals from a transmitting device;
    receiving element spacings for each spatial dimension of an array of antennas at the transmitting device;
    measuring a channel matrix based on the reference signals;
    extracting, based on the channel matrix, a line of sight channel parameter for each element spacing for each spatial dimension of the array of antennas at the transmitting device; and
    selecting a spacing for antennas in the array of antennas in each spatial dimension that optimizes a capacity of a communication link.

11. The method according to claim 10, further comprising signaling the spacing that optimizes the capacity of the communication link.

12. The method according to claim 10, further comprising signaling a scaling factor for the matrix for the spacing that optimizes the capacity of a communication link.

13. The method according to claim 10, wherein the element spacings comprise allowed element spacings.

14. The method according to claim 10, further comprising determining the spacing for antennas in the array of antennas in each spatial dimension that optimizes a capacity of a communication link based on the line of sight channel parameter.

15. An apparatus comprising:
a controller that controls operation of the apparatus;
an array of antenna elements; and
a transceiver coupled to the controller and coupled to the array of antenna elements, where the transceiver
transmits reference symbols from a regularly spaced subset of a set of the antenna elements with elements spanning one or more spatial dimensions, and
signals transmit antenna element spacings in each dimension that can be used by the transceiver for data transmission, where the transmit antenna element spacings are signaled in the form of ratios to the spacing of antenna elements that were used for the transmitted references symbols.

16. The apparatus according to claim 15, wherein the regularly spaced subset of the antenna elements is generated by a combination of a subset from the antenna elements of a horizontal dimension antenna array and a subset from the antenna elements of a vertical dimension antenna array.

17. The apparatus according to claim 15,
wherein the transceiver receives a line of sight channel parameter, and
wherein the controller selects the transmit antenna element spacings in each spatial dimension that maximize a communication link capacity based on the line of sight channel parameter.

18. The apparatus according to claim 17, wherein the controller generates a number of antenna elements for transmission in each dimension based on the selected transmit antenna element spacings.

19. The apparatus according to claim 18, wherein a product of the number of antenna elements in each dimension is less than a predefined value.

20. The apparatus according to claim 17, wherein the transceiver receives an additional line of sight channel parameter that includes a scaling factor for the line of sight channel.

21. An apparatus comprising:
a transceiver that
receives reference signals from a transmitting device, and
receives element spacings for each spatial dimension of an array of antennas at the transmitting device; and
a controller that
measures a channel matrix based on the reference signals,
extracts, based on the channel matrix, a line of sight channel parameter for each element spacing for each spatial dimension of the array of antennas at the transmitting device, and
selects a spacing for antennas in the array of antennas in each spatial dimension that optimizes a capacity of a communication link.

22. The apparatus according to claim 21, wherein the transceiver signals the spacing that optimizes the capacity of the communication link.

* * * * *